(12) United States Patent
Wang et al.

(10) Patent No.: US 11,165,483 B2
(45) Date of Patent: Nov. 2, 2021

(54) PRECODING MATRIX INDICATING AND DETERMINING METHOD, AND COMMUNICATIONS APPARATUS

(71) Applicant: Huawei Technologies Co., Ltd., Shenzhen (CN)

(72) Inventors: Xiaohan Wang, Shanghai (CN); Huangping Jin, Shanghai (CN); Xiaoyan Bi, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/171,714

(22) Filed: Feb. 9, 2021

(65) Prior Publication Data

US 2021/0167835 A1 Jun. 3, 2021

Related U.S. Application Data

(63) Continuation of application No. PCT/CN2019/099351, filed on Aug. 6, 2019.

(30) Foreign Application Priority Data

Aug. 10, 2018 (CN) .......................... 201810910281.2

(51) Int. Cl.
*H04B 7/02* (2018.01)
*H04B 7/06* (2006.01)
(Continued)

(52) U.S. Cl.
CPC ......... *H04B 7/0639* (2013.01); *H04B 7/0456* (2013.01); *H04B 7/0626* (2013.01); *H04B 7/10* (2013.01)

(58) Field of Classification Search
CPC .. H04B 7/0639; H04B 7/0456; H04B 7/0626; H04B 7/10; H04B 7/06
(Continued)

(56) References Cited

U.S. PATENT DOCUMENTS

| | | | |
|---|---|---|---|
| 2011/0142147 A1* | 6/2011 | Chen | ..................... H04B 7/0417 375/260 |
| 2017/0041113 A1* | 2/2017 | Park | ....................... H04B 7/063 |
| 2019/0173538 A1* | 6/2019 | Wu | ....................... H04L 5/0048 |

FOREIGN PATENT DOCUMENTS

| | | |
|---|---|---|
| EP | 3343791 A1 | 7/2018 |
| EP | 3675380 A1 | 7/2020 |
| EP | 3806346 A1 | 4/2021 |

* cited by examiner

*Primary Examiner* — Helene E Tayong
(74) *Attorney, Agent, or Firm* — Slater Matsil, LLP

(57) ABSTRACT

A precoding matrix indicating and determining method, including determining a precoding matrix indicator (PMI) having R groups of space-frequency information corresponding to R transmission layers, where the R groups of space-frequency information are used to determine a precoding matrix of each subband, and an rth group of space-frequency information in the R groups indicates P×L space domain vectors corresponding to an rth transmission layer in the R transmission layers, K frequency domain vectors corresponding to the rth transmission layer, and P×L×K coefficients corresponding to the rth transmission layer, where each of the P×L×K coefficients indicates a linear superposition coefficient of a vector operation result of a P×L space domain vectors and one of the K frequency domain vectors, R is a quantity of transmission layers, P is a quantity of polarization directions, and R, r, P, L, and K are all positive integers, and sending the PMI.

20 Claims, 6 Drawing Sheets

(51) Int. Cl.
*H04B 7/0456* (2017.01)
*H04B 7/10* (2017.01)
(58) Field of Classification Search
USPC .......................................................... 375/267
See application file for complete search history.

PRECODING MATRIX INDICATING AND DETERMINING METHOD, AND COMMUNICATIONS APPARATUS

CROSS-REFERENCE TO RELATED APPLICATIONS

This application is a continuation of International Application No. PCT/CN2019/099351, filed on Aug. 6, 2019, which claims priority to Chinese Patent Application No. 201810910281.2, filed on Aug. 10, 2018. The disclosures of the aforementioned applications are hereby incorporated by reference in their entireties.

TECHNICAL FIELD

This application relates to the field of wireless communications, and more specifically, to a precoding matrix indication method, a precoding matrix determining method, and a communications apparatus.

BACKGROUND

In a massive multiple-input multiple-output (MIMO) technology, interference between a plurality of users and interference between a plurality of signal streams of a same user may be reduced through precoding. This helps improve signal quality, implement spatial multiplexing, and improve spectrum utilization.

Currently, according to an existing precoding matrix feedback method, a terminal device may perform channel measurement based on a received reference signal, determine an ideal precoding matrix, and feed back the ideal precoding matrix to a network device through a precoding matrix indicator (PMI). To improve feedback precision and enable the network device to obtain a precoding matrix that is approximate to the ideal precoding matrix, the terminal device may indicate the ideal precoding matrix to the network device through two-level feedbacks: a wideband feedback and a subband feedback. Specifically, the terminal device may indicate selected beams and a quantized value of a wideband amplitude coefficient of each beam through the wideband feedback, and may indicate, through the subband feedback, a quantized value of a combinatorial coefficient that may be used for each subband. The combinatorial coefficient includes, for example, a subband amplitude coefficient and a subband phase coefficient. The network device may restore, based on both information indicated through the wideband feedback and information indicated through the subband feedback, the precoding matrix that is approximate to the ideal precoding matrix.

To improve spectrum resource utilization, the network device may transmit data to the terminal device by using a plurality of transmission layers. However, if the terminal device performs the foregoing wideband feedback and subband feedback based on each transmission layer, feedback overheads are relatively high.

SUMMARY

This application provides a precoding matrix indication method, a precoding matrix determining method, and a communications apparatus, to reduce PMI feedback overheads.

According to one aspect, a precoding matrix indication method is provided. The method may be performed by a terminal device, or may be performed by a chip configured in the terminal device.

Particularly, the method includes: determining a precoding matrix indicator PMI, where the PMI includes R groups of space-frequency information corresponding to R transmission layers, the R groups of space-frequency information are used to determine a precoding matrix corresponding to each subband, and an $r^{th}$ group of space-frequency information in the R groups of space-frequency information is used to indicate P×L space domain vectors corresponding to an $r^{th}$ transmission layer in the R transmission layers, K frequency domain vectors corresponding to the $r^{th}$ transmission layer, and P×L×K coefficients corresponding to the $r^{th}$ transmission layer, and sending the PMI.

The P×L space domain vectors are determined by L beam vectors in each of P polarization directions and wideband amplitude coefficients of the L beam vectors, each of the P×L×K coefficients is used to indicate a linear superposition coefficient of a vector operation result of one of the P×L space domain vectors and one of the K frequency domain vectors, R is a quantity of transmission layers, P is a quantity of polarization directions, and R, r, P, L, and K are all positive integers.

According to another aspect, a precoding matrix determining method is provided. The method may be performed by a network device, or may be performed by a chip configured in the network device.

Particularly, the method includes: receiving a PMI, where the PMI includes R groups of space-frequency information corresponding to R transmission layers, and an $r^{th}$ group of space-frequency information in the R groups of space-frequency information is used to indicate P×L space domain vectors corresponding to an $r^{th}$ transmission layer in the R transmission layers, K frequency domain vectors corresponding to the $r^{th}$ transmission layer, and P×L×K coefficients corresponding to the $r^{th}$ transmission layer, and determining, based on the R groups of space-frequency information, a precoding matrix corresponding to each subband.

The P×L space domain vectors are determined by L beam vectors in each of P polarization directions and wideband amplitude coefficients of the L beam vectors, each of the P×L×K coefficients is used to indicate a linear superposition coefficient of a vector operation result of one of the P×L space domain vectors and one of the K frequency domain vectors, R is a quantity of transmission layers, P is a quantity of polarization directions, and R, r, P, L, and K are all positive integers.

According to the foregoing technical solution, the terminal device may represent column vectors in ideal precoding matrices of each subband in frequency domain by using linear combinations of beam vectors in space domain, and describe, by using linear combinations of several frequency domain vectors, weighting coefficients used in the linear combinations of the beam vectors. Each frequency domain vector may be used to represent a change rule of the weighting coefficients used in the linear combinations of the beam vectors on a plurality of subbands. Therefore, a change rule of linear combination coefficients of the space domain vectors of the subbands may be described by performing different linear combinations on the several frequency domain vectors.

Because different change rules in frequency domain are described by using a plurality of frequency domain vectors, a relationship between the subbands is fully used, and change rules on all subbands may be described by using a relatively small quantity of frequency domain vectors according to continuity in frequency domain, to compress feedback overheads. Compared with per-subband feedbacks in the conventional technology, feedback overheads caused by subband feedbacks can be greatly reduced, and precision of approximation performed by using a type II codebook can also be ensured.

In this embodiment of this application, for ease of differentiation and description, the foregoing feedback mode may be referred to as a feedback mode of a wideband feedback and a joint subband feedback. Correspondingly, a feedback mode of a type II codebook defined in the NR protocol TS38.214 release 15 (R15) in the conventional technology may be referred to as a feedback mode of a wideband feedback and a per-subband feedback.

In one embodiment, the space domain vector is a $(P \times N_{tx}) \times 1$-dimensional column vector, the frequency domain vector is an $N_{sb} \times 1$-dimensional column vector, and the vector operation result includes: a product of the space domain vector and a conjugate transpose of the frequency domain vector, or a Kronecker product of a conjugate of the frequency domain vector and the space domain vector, where $N_{tx}$ is a quantity of antenna ports in each polarization direction, $N_{sb}$ is a quantity of to-be-reported subbands, $1 \leq L \leq N_{tx}$, $1 \leq K \leq N_{sb}$, and both $N_{tx}$ and $N_{sb}$ are positive integers.

In another embodiment, the terminal device determines a PMI, where the PMI is used to determine precoding matrices corresponding to $N_{sb}$ subbands, and the precoding matrices are obtained based on R space-frequency matrices corresponding to R transmission layers. The PMI includes R groups of indication information corresponding to the R space-frequency matrices. An $r^{th}$ group of indication information in the R groups of indication information is used to indicate P×L space domain column vectors corresponding to an $r^{th}$ transmission layer and K frequency domain column vectors corresponding to the $r^{th}$ transmission layer, and is used to determine P×L×K weighting coefficients of an $r^{th}$ space-frequency matrix. Each weighting coefficient is used to indicate a weight, in the $r^{th}$ space-frequency matrix, of a product of one of the P×L space domain column vectors and a conjugate transpose of one of the K frequency domain column vectors, or a weight, in the $r^{th}$ space-frequency matrix, a Kronecker product of a conjugate of a frequency domain column vector and a space domain column vector. The terminal device sends the PMI.

Correspondingly, the network device receives the PMI, where the PMI is used to determine the precoding matrices corresponding to the $N_{sb}$ subbands, and the precoding matrices are obtained based on the R space-frequency matrices corresponding to the R transmission layers. The PMI includes the R groups of indication information corresponding to the R space-frequency matrices. The $r^{th}$ group of indication information in the R groups of indication information is used to indicate the P×L space domain column vectors corresponding to the $r^{th}$ transmission layer and the K frequency domain column vectors corresponding to the $r^{th}$ transmission layer, and is used to determine the P×L×K weighting coefficients of the $r^{th}$ space-frequency matrix. Each weighting coefficient is used to indicate the weight, in the $r^{th}$ space-frequency matrix, of the product of one of the P×L space domain column vectors and the conjugate transpose of one of the K frequency domain column vectors, or the weight, in the $r^{th}$ space-frequency matrix, of the Kronecker product of the conjugate of the frequency domain column vector and the space domain column vector. The network device determines, based on the PMI, the precoding matrices corresponding to the $N_{sb}$ subbands.

It may be understood that the R groups of indication information are the R groups of space-frequency information. The R space-frequency matrices may be considered as a possible representation form of the R groups of space-frequency information.

In the foregoing embodiment, the P×L space domain column vectors may be determined by L beam vectors in each of P polarization directions and L wideband amplitude coefficients, a dimension of the space domain column vector may be $N_{tx} \times 1$, and a dimension of the frequency domain column vector may be $N_{sb} \times 1$. $N_{tx}$ is a quantity of antenna ports in each polarization direction, $N_{sb}$ is a quantity of to-be-reported subbands, P is a quantity of polarization directions, is $1 \leq L \leq N_{tx}$, $1 \leq K \leq N_{sb}$, and r, k, l, R, K, L, P, $N_{tx}$, and $N_{sb}$ are all positive integers.

It should be understood that the space-frequency matrix is merely a concept introduced for ease of understanding, and may be understood as an intermediate value in a process in which the terminal device determines the PMI or a process in which the network device determines the precoding matrix. This should not constitute any limitation on this application. Alternatively, the terminal device may not generate the space-frequency matrix, but the PMI is directly generated or the precoding matrix is directly determined.

In one embodiment, the space domain vector is a $(P \times N_{tx}) \times 1$-dimensional column vector, the frequency domain vector is a $1 \times N_{sb}$-dimensional row vector, and the vector operation result includes: a product of the space domain vector and the frequency domain vector, or a Kronecker product of a transpose of the frequency domain vector and the space domain vector, where $N_{tx}$ is a quantity of antenna ports in each polarization direction, $N_{sb}$ is a quantity of to-be-reported subbands, $1 \leq L \leq N_{tx}$, $1 \leq K \leq N_{sb}$, and both $N_{tx}$ and $N_{sb}$ are positive integers.

In one embodiment, the space domain vector is a $1 \times (P \times N_{tx})$-dimensional row vector, the frequency domain vector is a $1 \times N_{sb}$-dimensional row vector, and the vector operation result includes: a product of a conjugate transpose of the space domain vector and the frequency domain vector, or a Kronecker product of a transpose of the frequency domain vector and a conjugate transpose of the space domain vector, where $N_{tx}$ is a quantity of antenna ports in each polarization direction, $N_{sb}$ is a quantity of to-be-reported subbands, $1 \leq L \leq N_{tx}$, $1 \leq K \leq N_{sb}$, and both $N_{tx}$ and $N_{sb}$ are positive integers.

In one embodiment, the space domain vector is a $1 \times (P \times N_{tx})$-dimensional row vector, the frequency domain vector is an $N_{sb} \times 1$-dimensional column vector, and the vector operation result includes: a product of a conjugate transpose of the space domain vector and a conjugate transpose of the frequency domain vector, or a Kronecker product of a conjugate of the frequency domain vector and a conjugate transpose of the space domain vector, where $N_{tx}$ is a quantity of antenna ports in each polarization direction, $N_{sb}$ is a quantity of to-be-reported subbands, $1 \leq L \leq N_{tx}$, $1 \leq K \leq N_{sb}$, and both $N_{tx}$ and $N_{sb}$ are positive integers.

In one embodiment, the space domain vector is a $(P \times N_{tx}) \times 1$-dimensional column vector, the frequency domain vector is an $N_{sb} \times 1$-dimensional column vector, and the vector operation result includes: a product of the space domain vector and a conjugate transpose of the frequency domain vector, or a Kronecker product of a conjugate of the frequency domain vector and the space domain vector, where $N_{tx}$ is a quantity of antenna ports in each polarization direction, $N_{sb}$ is a quantity of to-be-reported subbands, $1 \leq L \leq N_{tx}$, $1 \leq K \leq N_{sb}$, and both $N_{tx}$ and $N_{sb}$ are positive integers.

The foregoing lists specific forms of corresponding vector operation results when the beam vector and the frequency domain vector each are in different forms. It may be understood that specific forms of the beam vector and the frequency domain vector are not limited in this application. A person skilled in the art may perform mathematical transformation or equivalent replacement on these beam vectors and frequency domain vectors based on a concept of this embodiment of this application, to achieve a technical effect the same as or similar to that of this application.

In one embodiment, the L beam vectors are from a subset of a predefined first vector set, the PMI further includes indication information of the first subset, and the indication information of the first subset is used to indicate a position, in the first vector set, of each vector in the first subset.

The first vector set may be extended to a plurality of subsets by using an oversampling factor, and the L beam vectors may be from one of the plurality of subsets. For ease of differentiation and description, the subset to which the L beam vectors belong is denoted as the first subset. The terminal device may indicate each beam vector in the first subset by using the PMI, so that the network device determines the L beam vectors.

In one embodiment, the K frequency domain vectors are from a second subset of a predefined second vector set, the PMI further includes indication information of the second subset, and the indication information of the second subset is used to indicate a position, in the second vector set, of each vector in the second subset.

The second vector set may also be extended to a plurality of subsets by using an oversampling factor, and the K frequency domain vectors may be from one of the plurality of subsets. For ease of differentiation and description, the subset to which the K frequency domain vectors belong is denoted as the second subset. The terminal device may indicate each beam vector in the second subset by using the PMI, so that the network device determines the K frequency domain vectors.

In one embodiment, the method further includes: receiving first indication information, where the first indication information is used to indicate a value of K.

In one embodiment, the method further includes: sending first indication information, where the first indication information is used to indicate a value of K.

In other words, the network device may indicate a quantity of frequency domain vectors to the terminal device.

It should be understood that the quantity of frequency domain vectors may also be predefined, for example, defined in a protocol.

In one embodiment, the method further includes: receiving second indication information, where the second indication information is used to indicate a value of L.

In one embodiment, the method further includes: sending second indication information, where the second indication information is used to indicate a value of L.

In other words, the network device may indicate a quantity of beam vectors to the terminal device.

It should be understood that the quantity of beam vectors may also be predefined, for example, defined in a protocol.

By determining the quantity L of frequency domain vectors and the quantity K of beam vectors, the terminal device may determine the L beam vectors from the first vector set and the K frequency domain vectors from the second vector set based on L and K, and further determine wideband amplitude coefficients of each beam vector in the P polarization directions and P×L×K coefficients based on the L beam vectors and the K frequency domain vectors.

In one embodiment, the space domain vector is a $(P \times N_{tx}) \times 1$-dimensional column vector, and the frequency domain vector is an $N_{sb} \times 1$-dimensional column vector.

If the quantity of polarization directions is 1, the determining, based on the R groups of space-frequency information, a precoding matrix corresponding to each subband includes: selecting, in a traversing manner, each of 1 to $N_{sb}$ as a value of $n_{sb}$, and repeatedly performing the following operations, to obtain the precoding matrix corresponding to each subband:

selecting, in a traversing manner, each of 1 to R as a value of r, and repeatedly performing the following operation to determine a precoding matrix of an $n_{sb}^{th}$ subband: determining a precoding vector $w_{r,n_{sb}}$ of the $n_{sb}^{th}$ subband at the $r^{th}$ transmission layer based on the P×L space domain vectors, the K frequency domain vectors, and the P×L×K coefficients that are indicated by the $r^{th}$ group of space-frequency information in the R groups of space-frequency information:

$$w_{r,n_{sb}} = \sum_{l=1}^{L} v_l a_{r,l}^{(1)} \left( \sum_{k=1}^{K} a_{r,k,l}^{(2)} \varphi_{r,l,k} \overline{u}_{r,k,n_{sb}} \right),$$

where $v_l$ represents an $l^{th}$ beam vector in the L beam vectors corresponding to the $r^{th}$ transmission layer, $a_{r,l}^{(1)}$ represents a quantized value of an amplitude coefficient of $v_l$, $u_{r,k,n_{sb}}$ represents an $n_{sb}^{th}$ element in a $k^{th}$ frequency domain vector in the K frequency domain vectors corresponding to the $r^{th}$ transmission layer, $\overline{u}_{r,k,n_{sb}}$ represents a conjugate of $u_{r,k,n_{sb}}$, $a_{r,l,k}^{(2)}$ represents a quantized value of an amplitude of a linear superposition coefficient corresponding to an $l^{th}$ space domain vector in the P×L space domain vectors and the $k^{th}$ frequency domain vector in the K frequency domain vectors, $\varphi_{r,l,k}$ represents a quantized value of a phase of the linear superposition coefficient corresponding to the $l^{th}$ space domain vector in the P×L space domain vectors and the $k^{th}$ frequency domain vector in the K frequency domain vectors, and k and l are both positive integers.

Based on the foregoing operations, the network device may determine the precoding matrix of each subband based on the R groups of space-frequency information indicated in the PMI.

In one embodiment, the space domain vector is a $(P \times N_{tx}) \times 1$-dimensional column vector, and the frequency domain vector is a $1 \times N_{sb}$-dimensional row vector.

If the quantity of polarization directions is 1, the determining, based on the R groups of space-frequency information, a precoding matrix corresponding to each subband includes: selecting, in a traversing manner, each of 1 to $N_{sb}$ as a value of $n_{sb}$, and repeatedly performing the following operations, to obtain the precoding matrix corresponding to each subband:

selecting, in a traversing manner, each of 1 to R as a value of r, and repeatedly performing the following operation to determine a precoding matrix of an $n_{sb}^{th}$ subband: determining a precoding vector $w_{r,n_{sb}}$ of the $n_{sb}^{th}$ subband at the $r^{th}$ transmission layer based on the P×L space domain vectors, the K frequency domain vectors, and the P×L×K coefficients that are indicated by the $r^{th}$ group of space-frequency information in the R groups of space-frequency information:

$$w_{r,n_{sb}} = \sum_{l=1}^{L} v_l a_{r,l}^{(1)} \left( \sum_{k=1}^{K} a_{r,l,k}^{(2)} \varphi_{r,l,k} u_{r,k,n_{sb}} \right).$$

The parameters have been described in detail above. For brevity, details are not described herein again.

Based on the foregoing operations, the network device may determine the precoding matrix of each subband based on the R groups of space-frequency information indicated in the PMI.

In one embodiment, the space domain vector is a $(P \times N_{tx}) \times 1$-dimensional column vector, and the frequency domain vector is an $N_{sb} \times 1$-dimensional column vector.

If the quantity of polarization directions is 2, the determining, based on the R groups of space-frequency information, a precoding matrix corresponding to each subband includes: selecting, in a traversing manner, each of 1 to $N_{sb}$ as a value of $n_{sb}$, and repeatedly performing the following operations, to obtain the precoding matrix corresponding to each subband:

$$w_{r,n_{sb}} = \begin{bmatrix} \sum_{l=1}^{L} v_l a_{r,l}^{(1)} \left( \sum_{k=1}^{K} a_{r,l,k}^{(2)} \varphi_{r,l,k} \bar{u}_{r,k,n_{sb}} \right) \\ \sum_{l=1}^{L} v_l a_{r,l+L}^{(1)} \left( \sum_{k=1}^{K} a_{r,l+L,k}^{(2)} \varphi_{r,l+L,k} \bar{u}_{r,k,n_{sb}} \right) \end{bmatrix},$$

where $v_l$ represents an $l^{th}$ column vector in the L column vectors corresponding to the $r^{th}$ transmission layer, $d_{r,l}^{(1)}$ represents a quantized value of an amplitude coefficient of $v_l$ in a first polarization direction, $a_{r,l+L}^{(1)}$ represents a quantized value of an amplitude coefficient of $v_l$ in a second polarization direction, $u_{r,k,j}$ represents an $n_{sb}^{th}$ element in a $k^{th}$ column vector in the K column vectors corresponding to the $r^{th}$ transmission layer, and $\bar{u}_{r,k,n_{sb}}$ represents a conjugate of $u_{r,k,n_{sb}}$. $a_{r,l,k}^{(2)}$ represents a quantized value of an amplitude of a linear superposition coefficient corresponding to the $l^{th}$ space domain vector in the L space domain vectors and the $k^{th}$ frequency domain vector in the K frequency domain vectors in the first polarization direction, that is, a quantized value of an amplitude of a linear superposition coefficient of a vector operation result of $v_l$ and $u_{r,k}$ in the first polarization direction. $a_{r,l+L,k}^{(2)}$ represents a quantized value of an amplitude of a linear superposition coefficient corresponding to the $l^{th}$ space domain vector in the L space domain vectors and the $k^{th}$ frequency domain vector in the K frequency domain vectors in the second polarization direction, that is, a quantized value of an amplitude of a linear superposition coefficient of a vector operation result of $v_l$ and $u_{r,k}$ in the second polarization direction. $\varphi_{r,l,k}$ represents a quantized value of a phase of the linear superposition coefficient corresponding to the $l^{th}$ space domain vector in the L space domain vectors and the $k^{th}$ frequency domain vector in the K frequency domain vectors in the first polarization direction, that is, a quantized value of a phase coefficient of a vector operation result of $v_l$ and $u_{r,k}$. $\varphi_{r,l+L,k}$ represents a quantized value of a phase of a linear superposition coefficient corresponding to the $l^{th}$ space domain vector in the L space domain vectors and the $k^{th}$ frequency domain vector in the K frequency domain vectors in the second polarization direction, that is, a quantized value of a phase of a linear superposition coefficient of a vector operation result of $v_l$ and $u_{r,k}$, and k and l are both positive integers.

Based on the foregoing operations, the network device may determine the precoding matrix of each subband based on the R groups of space-frequency information indicated in the PMI.

In one embodiment, the space domain vector is a $(P \times N_{tx}) \times 1$-dimensional column vector, and the frequency domain vector is a $1 \times N_{sb}$-dimensional row vector.

If the quantity of polarization directions is 2, the determining, based on the R groups of space-frequency information, a precoding matrix corresponding to each subband includes: selecting, in a traversing manner, each of 1 to $N_{sb}$ as a value of $n_{sb}$, and repeatedly performing the following operations, to obtain the precoding matrix corresponding to each subband:

$$w_{r,n_{sb}} = \begin{bmatrix} \sum_{l=1}^{L} v_l a_{r,l}^{(1)} \left( \sum_{k=1}^{K} a_{r,l,k}^{(2)} \varphi_{r,l,k} u_{r,k,n_{sb}} \right) \\ \sum_{l=1}^{L} v_l a_{r,l+L}^{(1)} \left( \sum_{k=1}^{K} a_{r,l+L,k}^{(2)} \varphi_{r,l+L,k} u_{r,k,n_{sb}} \right) \end{bmatrix}.$$

The parameters have been described in detail above. For brevity, details are not described herein again.

Based on the foregoing operations, the network device may determine the precoding matrix of each subband based on the R groups of space-frequency information indicated in the PMI.

According to yet another aspect, a precoding matrix indication method is provided. The method may be performed by a terminal device, or may be performed by a chip configured in the terminal device.

Particularly, the method includes: receiving third indication information, where the third indication information is used to determine a feedback mode for feeding back a PMI based on a type II codebook, the feedback mode is a first feedback mode or a second feedback mode, the first feedback mode is a mode for feeding back the PMI based on a first vector set, the second feedback mode is a mode for feeding back the PMI based on the first vector set and a second vector set, the first vector set includes a plurality of $N_{tx}$-dimensional vectors, the second vector set includes a plurality of $N_{sb}$-dimensional vectors, $N_{tx}$ is a quantity of transmit antenna ports in each polarization direction, $N_{sb}$ is a quantity of to-be-reported subbands, and both $N_{tx}$ and $N_{sb}$ are positive integers, and determining and sending the PMI based on the feedback mode.

According to still another aspect, a precoding matrix indication method is provided. The method may be performed by a network device, or may be performed by a chip configured in the network device.

Particularly, the method includes: generating third indication information, where the third indication information is used to determine a feedback mode for feeding back a PMI based on a type II codebook, the feedback mode is a first feedback mode or a second feedback mode, the first feedback mode is a mode for feeding back the PMI based on a first vector set, the second feedback mode is a mode for feeding back the PMI based on the first vector set and a second vector set, the first vector set includes a plurality of $N_{tx}$-dimensional vectors, the second vector set includes a plurality of $N_{sb}$-dimensional vectors, $N_{tx}$ is a quantity of transmit antenna ports in each polarization direction, $N_{sb}$ is a quantity of to-be-reported subbands, and both $N_{tx}$ and $N_{sb}$ are positive integers, sending the third indication information, and receiving the PMI, where the PMI is determined based on the feedback mode.

Based on the foregoing technical solution, the terminal device may determine the feedback mode based on an indication of the network device, or based on at least the quantity or positions of the to-be-reported subbands. In some cases, the PMI may be fed back in a feedback mode with relatively low feedback overheads. For example, when there are a relatively large quantity of to-be-reported subbands or continuity is relatively good, the PMI is fed back in the feedback mode with relatively low feedback overheads. This can ensure relatively high approximation precision, and can also reduce feedback overheads. A plurality of feedback modes are introduced to adapt to different measurement cases, and both feedback precision and feedback overheads may be considered, thereby achieving a balance between the two. In addition, the second feedback mode provided in this application may be well compatible with an existing feedback mode, and has a small change to an existing protocol and is easy to implement.

It should be understood that the second feedback mode is not limited to the feedback mode of a wideband feedback and a joint subband feedback disclosed in this application. The second feedback mode may be, for example, a feedback mode of a wideband feedback and a part subband feedback. The first feedback mode may still be a feedback mode of a type II codebook defined in the NR protocol TS38.214 R15. For ease of distinguishing from the second feedback mode, the first feedback mode may also be referred to as a feedback mode of a wideband feedback and an all subband feedback.

In one embodiment, the third indication information includes indication information of the feedback mode of the PMI.

In other words, the network device indicates a feedback mode used by the terminal device to feed back the PMI.

In one embodiment, the third indication information is used to indicate the quantity and the positions of the to-be-reported subbands. The method further includes: determining the feedback mode of the PMI according to a preset rule based on at least the quantity or the positions of the to-be-reported subbands.

That is, the terminal device and the network device determine the feedback mode of the PMI according to a same preset rule. Particularly, the terminal device may determine, according to the preset rule based on at least the quantity or the positions of the to-be-reported subbands, the feedback mode used to feed back the PMI. After determining the feedback mode based on the preset rule, the network device may restore a precoding matrix based on the feedback mode and the PMI.

In one embodiment, the third indication information is carried in a radio resource control RRC message.

In one embodiment, when the feedback mode is the second feedback mode, the PMI includes R groups of space-frequency information corresponding to R transmission layers, the R groups of space-frequency information are used to determine a precoding matrix corresponding to each subband, and an $r^{th}$ group of space-frequency information in the R groups of space-frequency information is used to indicate:

P×L space domain vectors corresponding to an $r^{th}$ transmission layer,

K frequency domain vectors corresponding to the $r^{th}$ transmission layer, and P×L×K coefficients corresponding to the $r^{th}$ transmission layer.

The P×L space domain vectors are determined by L beam vectors in each of P polarization directions and wideband amplitude coefficients of the L beam vectors, each of the P×L×K coefficients is used to indicate a linear superposition coefficient of a vector operation of one of the P×L space domain vectors and one of the K frequency domain vectors, the L beam vectors from the first vector set, and the K frequency domain vectors are from the second vector set. R is a quantity of transmission layers, P is a quantity of polarization directions, and R, r, P, L, and K are all positive integers.

Particularly, when the feedback mode is the second feedback mode, the terminal device or the chip configured in the terminal device may be configured to perform the method in any possible implementation of the first aspect, and the network device or the chip configured in the network device may be configured to perform the method in any possible implementation of the second aspect.

According to another aspect, a communications apparatus is provided and includes modules or units configured to perform the method in any possible implementation of the first aspect or the third aspect.

According to a yet another aspect, a communications apparatus is provided and includes a processor. The processor is coupled to a memory, and may be configured to read and execute an instruction in the memory, to implement the method according to any possible implementation of the first aspect or the third aspect. In one embodiment, the communications apparatus further includes the memory. In one embodiment, the communications apparatus further includes a communications interface, and the processor is coupled to the communications interface.

In one embodiment, the communications apparatus is a terminal device. When the communications apparatus is the terminal device, the communications interface may be a transceiver, or an input/output interface.

In one embodiment, the communications apparatus is a chip configured in a terminal device. When the communications apparatus is the chip configured in the terminal device, the communications interface may be an input/output interface.

In one embodiment, the transceiver may be a transceiver circuit. In one embodiment, the input/output interface may be an input/output circuit.

According to still another aspect, a communications apparatus is provided and includes modules or units configured to perform the method in any possible implementation of the second aspect or the fourth aspect.

According to another aspect, a communications apparatus is provided and includes a processor. The processor is coupled to a memory, and may be configured to read and execute an instruction in the memory, to implement the method according to any possible implementation of the second aspect or the fourth aspect. In one embodiment, the communications apparatus further includes the memory. In one embodiment, the communications apparatus further includes a communications interface, and the processor is coupled to the communications interface.

In one embodiment, the communications apparatus is a network device. When the communications apparatus is the network device, the communications interface may be a transceiver, or an input/output interface.

In one embodiment, the communications apparatus is a chip configured in a network device. When the communications apparatus is the chip configured in the network device, the communications interface may be an input/output interface.

In one embodiment, the transceiver may be a transceiver circuit. In one embodiment, the input/output interface may be an input/output circuit.

According to yet another aspect, a processor is provided, and includes an input circuit, an output circuit, and a processing circuit. The processing circuit is configured to receive a signal through the input circuit, and transmit a signal through the output circuit, so that the processor performs the method according to any one of the first aspect to the fourth aspect or the possible implementations of the first aspect to the fourth aspect.

In one embodiment, the processor may be a chip, the input circuit may be an input pin, the output circuit may be an output pin, and the processing circuit may be a transistor, a gate circuit, a trigger, various logic circuits, or the like. The input signal received by the input circuit may be received and input by, for example, but not limited to, a receiver, the signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in this embodiment of this application.

According to still another aspect, a processing apparatus is provided, and includes a processor and a memory. The processor is configured to read an instruction stored in the memory, receive a signal through a receiver, and transmit a signal through a transmitter, to perform the method according to any one of the first aspect to the fourth aspect or the possible implementations of the first aspect to the fourth aspect.

In one embodiment, there are one or more processors and one or more memories.

In one embodiment, the memory may be integrated into the processor, or the memory and the processor may be separately disposed.

In one embodiment, the memory may be a non-transitory memory, for example, a read-only memory (ROM). The memory and the processor may be integrated on a same chip, or may be separately disposed on different chips. A type of the memory and a manner of disposing the memory and the processor are not limited in the embodiments of this application.

It should be understood that a related data exchange process, for example, sending indication information, may be a process of outputting indication information from the processor, and receiving capability information may be a process of receiving input capability information by the processor. Specifically, data output by the processor may be output to the transmitter, and input data received by the processor may be from the receiver. The transmitter and the receiver may be collectively referred to as a transceiver.

In one embodiment, the processing apparatus may be a chip. The processor may be implemented by using hardware, or may be implemented by using software. When the processor is implemented by using the hardware, the processor may be a logic circuit, an integrated circuit, or the like, or when the processor is implemented by using the software, the processor may be a general-purpose processor, and is implemented by reading software code stored in the memory. The memory may be integrated into the processor, may be located outside the processor, and may exist independently.

According to another aspect, a computer program product is provided. The computer program product includes a computer program (also referred to as code or an instruction), and when the computer program is executed, a computer performs the methods in the first aspect to the fourth aspect and any possible implementation of the first aspect to the fourth aspect.

According to yet another aspect, a computer readable medium is provided. The computer readable medium stores a computer program (also referred to as code or an instruction), and when the computer program is run on a computer, the computer performs the methods in the first aspect to the fourth aspect and any possible implementation of the first aspect to the fourth aspect.

According to still another aspect, a communications system is provided. The system includes the foregoing network device and terminal device.

BRIEF DESCRIPTION OF THE DRAWINGS

The FIG. 1 is a schematic diagram of a communications system to which a precoding matrix indication and a precoding matrix determining method are applicable according to an embodiment of this application.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

DETAILED DESCRIPTION OF ILLUSTRATIVE EMBODIMENTS

The following describes technical solutions of this application with reference to the accompanying drawings.

The technical solutions of the embodiments of this application may be applied to various communications systems, such as a global system for mobile communications (GSM), a code division multiple access (CDMA) system, a wide-band code division multiple access (WCDMA) system, a general packet radio service (GPRS) system, a long term evolution (LTE) system, an LTE frequency division duplex (DD) system, an LTE time division duplex (TDD) system, a universal mobile telecommunications system (UMTS), a worldwide interoperability for microwave access (WiMAX) communications system, a future 5th generation (5G) system, or a new radio (NR) system.

Figure 1:
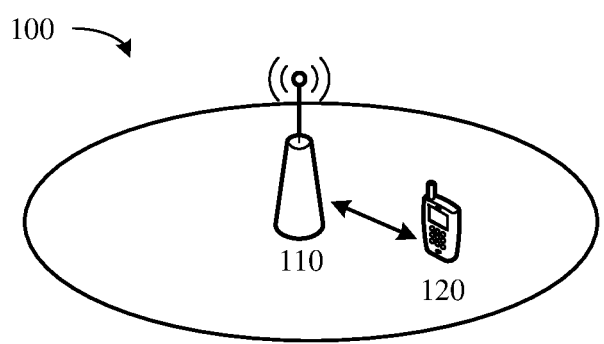

First, for ease of understanding the embodiments of this application, a communications system shown in FIG. 1 is used as an example to describe in detail a communications system to which the embodiments of this application are applicable. FIG. 1 is a schematic diagram of a communications system 100 to which a precoding matrix indication and a precoding matrix determining method are applicable according to an embodiment of this application. As shown in FIG. 1, the communications system 100 may include at least one network device, for example, a network device 110 shown in FIG. 1. The communications system 100 may further include at least one terminal device, for example, a terminal device 120 shown in FIG. 1. The network device 110 and the terminal device 120 may communicate with each other through a wireless link. A plurality of antennas may be configured for each communications device such as the network device 110 or the terminal device 120. For each communications device in the communications system 100, the configured plurality of antennas may include at least one transmit antenna configured to send a signal and at least one receive antenna configured to receive a signal. Therefore, communications devices, for example, the network device 110 and the terminal device 120 in the communications system 100, may communicate with each other by using a multi-antenna technology.

It should be understood that the network device in the communications system may be any device that has a wireless transceiver function. The network device includes but is not limited to an evolved NodeB (eNB), a radio network controller (RNC), a NodeB (NB), a base station controller (base station controller, BSC), a base transceiver station (BTS), a home evolved NodeB (for example, a home evolved NodeB, or a home NodeB, (HNB)), a baseband unit (BBU), an access point (AP), a wireless relay node, a wireless backhaul node, a transmission point (TP), a transmission and reception point (TRP), or the like in a wireless fidelity (WIFI) system. Alternatively, the network device may be a gNB or a transmission point (TRP or TP) in a 5G system such as an NR system, may be one antenna panel or a group (including a plurality of antenna panels) of antenna panels of a base station in a 5G system, or may be a network node, such as a baseband unit (BBU) or a distributed unit (DU), that constitutes a gNB or a transmission point.

In some deployments, the gNB may include a centralized unit (CU) and the DU. The gNB may further include a radio unit (RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the CU. It may be understood that the network device may be a CU node, a DU node, or a device including a CU node and a DU node. In addition, the CU may be classified as a network device in an access network (RAN), or may be classified as a network device in a core network (CN). This is not limited in this application.

It should be further understood that the terminal device in the system may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in the embodiments of this application may be a mobile phone, a tablet (Pad), a computer with a wireless transceiver function, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. An application scenario is not limited in the embodiments of this application.

It should be further understood that FIG. 1 is merely a simplified schematic diagram used as an example for ease of understanding. The communications system 100 may further include another network device or another terminal device, which is not shown in FIG. 1.

Figure 2:
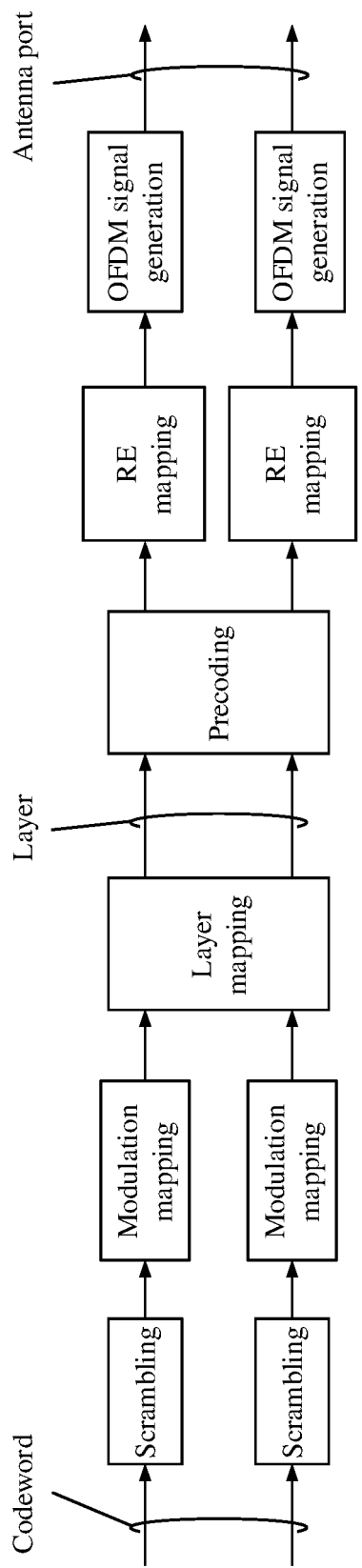
FIG. 2 is a schematic diagram of signal processing according to an embodiment of this application.

For ease of understanding the embodiments of this application, the following briefly describes a processing process of a signal at a physical layer before the signal is sent with reference to FIG. 2.

It should be understood that the signal processing process shown in FIG. 2 may be performed by the network device, a chip configured in the network device, the terminal device, or a chip configured in the terminal device. This is not limited in this application. For ease of description, a sending device is used in the following.

As shown in the figure, the sending device may process a codeword from a higher layer on a physical channel. The codeword may be a coded bit obtained through coding (for example, including channel coding). A codeword is scrambled to generate a scrambling bit. Modulation mapping is performed on the scrambling bit, to obtain a modulation symbol. The modulation symbol is mapped to a plurality of layers through layer mapping. A modulation symbol obtained through the layer mapping is precoded, to obtain a precoded signal. The precoded signal is mapped to a plurality of resource elements (RE) through RE mapping. These REs are then transmitted through an antenna port (antenna port) after orthogonal multiplexing (OFDM) modulation is performed on the REs.

In a precoding technology, when a channel state is known, a to-be-transmitted signal is preprocessed by the sending device, in other words, the to-be-transmitted signal is processed by using a precoding matrix matching a channel resource, so that a precoded to-be-transmitted signal adapts to a channel, and complexity of eliminating inter-channel impact at a receiving device is reduced. Therefore, after the to-be-sent signal is precoded, quality (for example, a signal to interference plus noise ratio (SINR)) of a received signal is improved. Therefore, transmission between a sending device and a plurality of receiving devices can be implemented on a same time-frequency resource by using the precoding technology. That is, multi-user multiple-input multiple-output (MU-MIMO) is implemented. It should be noted that related descriptions of the precoding technology are merely examples, but are not intended to limit the protection scope of the embodiments of this application. In a specific implementation process, precoding may be performed in another manner. For example, when a channel matrix cannot be learned, precoding is performed by using a preset precoding matrix or a weighting processing manner.

For brevity, specific content of the precoding manner is not further described in this specification.

To obtain a precoding matrix that can adapt to a channel, the sending device may perform channel measurement in advance by sending a reference signal, to obtain a feedback from the receiving device, so as to determine the precoding matrix.

In a possible implementation, after obtaining a channel matrix H of each subband through measurement based on the reference signal, the receiving device may determine an ideal precoding matrix of each subband by performing singular value decomposition (SVD) on the channel matrix H of each subband or a covariance matrix $HH^H$ of the channel matrix.

For example, SVD is performed on the channel matrix H. After SVD is performed on the channel matrix H, the following may be obtained:

$$H = U \cdot S \cdot V^H.$$

U and $V^H$ are unitary matrices, S is a diagonal matrix, and non-zero elements (that is, elements on a diagonal) of the diagonal matrix are singular values of the channel matrix H. These singular values may be usually arranged in descending order. A conjugate transpose V of the right unitary matrix $V^H$ is the ideal precoding matrix. In other words, the ideal precoding matrix is a precoding matrix obtained through calculation based on the channel matrix H.

Then, the receiving device may determine a precoding matrix that is approximate to the ideal precoding matrix of each subband, and feed back, to the sending device by using a PMI, the precoding matrix that is approximate to the ideal precoding matrix of each subband. The sending device may determine, based on the PMI, the precoding matrix that is approximate to the ideal precoding matrix of each subband. Therefore, the sending device can determine the precoding matrix that adapts to a channel, to perform precoding on a to-be-sent signal.

Therefore, a higher degree of approximation between a precoding matrix determined by the sending device based on the PMI and the ideal precoding matrix indicates that the precoding matrix can better adapt to a channel state, and therefore signal receiving quality can be improved. In other words, the receiving device expects to determine a precoding matrix indicator that is most approximate to the ideal precoding matrix, and send the precoding matrix indicator to the sending device.

It should be understood that, in downlink transmission, the sending device may be a network device or a chip configured in the network device, the receiving device may be a terminal device or a chip configured in the terminal device, and the reference signal may be a reference signal used for downlink channel measurement, for example, a channel state information reference signal (CSI-RS). The terminal device may perform CSI measurement based on the received CSI-RS, and feed back CSI of a downlink channel to the network device.

In uplink transmission, the sending device may also be a terminal device or a chip configured in the terminal device, the receiving device may be a network device or a chip configured in the network device, and the reference signal may be a reference signal used for uplink channel measurement, for example, a sounding reference signal (SRS). The network device may perform CSI measurement based on a received SRS, to indicate CSI of an uplink channel to the terminal device.

The CSI may include, for example, a precoding matrix indicator (PMI), a rank indication (RI), and a channel quality indicator (CQI).

It should be understood that the foregoing listed types of the reference signals are merely examples for description, and should not be construed as any limitation on this application. A possibility that another reference signal is used to implement a same function or a similar function is not excluded in this application.

In the conventional technology, codebooks based on which the terminal device feeds back the PMI may include two types of codebooks: a type I codebook and a type II codebook. An idea of the type I codebook is beam selection, and an idea of the type II codebook is linear beam combination. The type I codebook has lower feedback overheads, but lower approximation precision. The type II codebook has higher feedback overheads, but higher approximation precision.

To obtain a precoding matrix with relatively high approximation precision, the terminal device may determine the precoding matrix and feedback the PMI by using the type II codebook. Specifically, the terminal device may indicate selected beams and a quantized value of a wideband amplitude coefficient of each beam by using a wideband feedback, and may indicate, through a subband feedback, a quantized value of a combinatorial coefficient that may be used for each subband. The combinatorial coefficient includes, for example, a subband amplitude coefficient and a subband phase coefficient. The network device may restore, based on both information fed back by the wideband feedback and information fed back by the subband feedback, the precoding matrix that is approximate to the ideal precoding matrix.

The following is a simple example of a two-level codebook form with a rank 1.

$$W = W_1 W_2 = \begin{bmatrix} p_0 b_0, p_1 b_1, p_2 b_2, p_3 b_3 & 0 \\ 0 & p_4 b_0, p_5 b_1, p_6 b_2, p_7 b_3 \end{bmatrix} \begin{bmatrix} c_0 & c_1 & c_2 & c_3 & c_4 & c_5 & c_6 & c_7 \end{bmatrix}^T = \begin{bmatrix} p_0 c_0 b_0 + p_1 c_1 b_1 + p_2 c_2 b_2 + p_3 c_3 b_3 \\ p_4 c_4 b_0 + p_5 c_5 b_1 + p_6 c_6 b_2 + p_7 c_7 b_3 \end{bmatrix}.$$

W represents a to-be-fed-back precoding matrix of a subband at a transmission layer, $W_1$ is determined based on a wideband feedback, and $W_2$ is determined based on a subband feedback, $b_0$ to $b_3$ are beam vectors included in $W_1$, and may be indicated by using indexes of combinations of the plurality of beam vectors, $p_0$ to $p_7$ are wideband amplitude coefficients included in $W_1$, and may be indicated by using quantized values of the wideband amplitude coefficients, $c_0$ to $c_7$ are subband superposition coefficients included in $W_2$, and may include subband amplitude coefficients $\alpha_0$ to $\alpha_7$ and narrowband phase coefficients $\varphi_0$ to $\varphi_7$, which may be separately indicated by quantized values of the narrowband amplitude coefficients $\alpha_0$ to $\alpha_7$ and quantized values of the narrowband phase coefficients $\varphi_0$ to $\varphi_7$.

To improve spectrum resource utilization and a data transmission capability of the communications system, the network device may transmit data to the terminal device through a plurality of transmission layers. However, it can be learned from the foregoing formula that when a quantity of transmission layers increases, for example, when the quantity of transmission layers is 4, feedback overheads of $p_0$ to $p_7$ and $c_0$ to $c_7$ are four times that of one transmission layer. In other words, if the terminal device performs the foregoing wideband feedback and subband feedback based on each transmission layer, feedback overheads multiply as the quantity of transmission layers increases. A larger quantity of subbands leads to a greater increase in the feedback overheads. Therefore, it is expected that a method can be provided to achieve a balance between feedback overheads and approximation precision.

In view of this, this application provides a precoding matrix indication method. A feedback mode is flexibly selected based on a correlation between channels in frequency domain, to reduce feedback overheads as much as possible while ensuring data transmission quality. In addition, spectrum resource utilization can be improved, a data transmission capability of the communications system can be improved, and a throughput can be improved.

To facilitate understanding of the embodiments of this application, the following descriptions are provided.

First, in the embodiments of this application, a "beam" may be understood as distribution of signal strength formed in a spatial direction, and a "beam vector" may be used to represent the "beam". In the embodiments of this application, linear superposition may be performed on a plurality of beam vectors by using a beamforming technology, so that transmit beams form specific spatial directivity.

Second, in the embodiments of this application, a specific precoding matrix indication and a specific precoding matrix determining method are described in detail by using an example in which a subband is used as a frequency domain unit. However, this should not constitute any limitation on this application. It should be understood that the subband is merely a possible form of a frequency domain unit, and the frequency domain unit may alternatively be a subcarrier, a resource block (RB), or the like. This is not limited in this application. In addition, a precoding matrix corresponding to a subband in the embodiments of this application may be understood as a precoding matrix determined based on a channel matrix of the subband. In the embodiments below, unless otherwise specified, "a precoding matrix corresponding to a subband" and "a precoding matrix of a subband" may express a same meaning.

Third, in the embodiments of this application, transformation of a matrix is described in many places. For ease of understanding, a general description is provided herein. A superscript * represents a transpose, for example, A* represents a conjugate of a matrix (or vector) A. A superscript H represents a conjugate transpose, for example, $A^H$ represents a conjugate transpose of a matrix (or vector) A. For brevity, descriptions of a same or similar case are omitted below.

Fourth, in the embodiments, a Kronecker product operation of matrices is described. A Kronecker product is a block matrix obtained by multiplying all elements in a matrix by another matrix. For example, a kp×ql-dimensional matrix obtained by a Kronecker product of a k×l-dimensional matrix A and a p×q-dimensional matrix B is specifically as follows:

$$A \otimes B = \begin{bmatrix} a_{11}B & \cdots & a_{1l}B \\ \vdots & \ddots & \vdots \\ a_{k1}B & \cdots & a_{kl}B \end{bmatrix},$$

where $\otimes$ represents a Kronecker product operation.

Fifth, the terms "first", "second", "third", and "fourth", and various sequence numbers in the following embodiments are merely used for differentiation for ease of description, and are not used to limit the scope of the embodiments of this application. For example, different indication information is distinguished.

Sixth, in the embodiments shown below, "pre-obtaining" may include indicating by signaling of the network device or predefining, for example, defining in a protocol. The "predefining" may be implemented in a manner in which corresponding code, a table, or other related indication information may be prestored in a device (for example, the terminal device or the network device). A specific implementation of the "predefining" is not limited in this application.

Seventh, storing described in the embodiments of this application may be storing in one or more memories. The one or more memories may be separately disposed, or may be integrated into an encoder or a decoder, a processor, or a communications apparatus. Alternatively, some of the one or more memories may be separately disposed, and some of the one or more memories are integrated into a decoder, a processor, or a communications apparatus. The memory may be a storage medium in any form. This is not limited in this application.

Eighth, the "protocol" described in the embodiments of this application may be a standard protocol in the communications field, for example, may include an LTE protocol, an NR protocol, and a related protocol applied to a future communications system. This is not limited in this application.

Ninth, "at least one" indicates one or more, and "a plurality of" indicates two or more. The term "and/or" describes an association relationship between associated objects and represents that three relationships may exist. For example, A and/or B may represent the following three cases: Only A exists, both A and B exist, and only B exists. A and B may be in a singular or plural form. The character "/" generally indicates an "or" relationship between the associated objects. "At least one of the following" or a similar expression indicates any combination of the items, and includes any combination of singular items or plural items. For example, at least one of a, b, or c may indicate: a, b, c, a and b, a and c, b and c, or a, b, and c, where a, b, and c may be singular or plural.

The following describes in detail, with reference to the accompanying drawings, the precoding matrix indication method and the precoding matrix determining method that are provided in the embodiments of this application.

It should be understood that the methods provided in the embodiments of this application may be used in a system in which communication is performed by using a multi-antenna technology, for example, the communications system 100 shown in FIG. 1. The communications system may include at least one network device and at least one terminal device. The network device and the terminal device may communicate with each other by using the multi-antenna technology.

It should be further understood that a specific structure of an execution body of a method provided in the embodiments of this application is not specifically limited in the following embodiments provided that a program that records code for the method provided in the embodiments of this application can be run to perform communication according to the method provided in the embodiments of this application. For example, the execution body of the method provided in the embodiments of this application may be a terminal device, a network device, or a function module that can invoke and execute a program in the terminal device or the network device.

Without loss of generality, the following uses interaction between the network device and the terminal device as an example to describe in detail the precoding matrix indication method and the precoding matrix determining method provided in the embodiments of this application.

Figure 3:
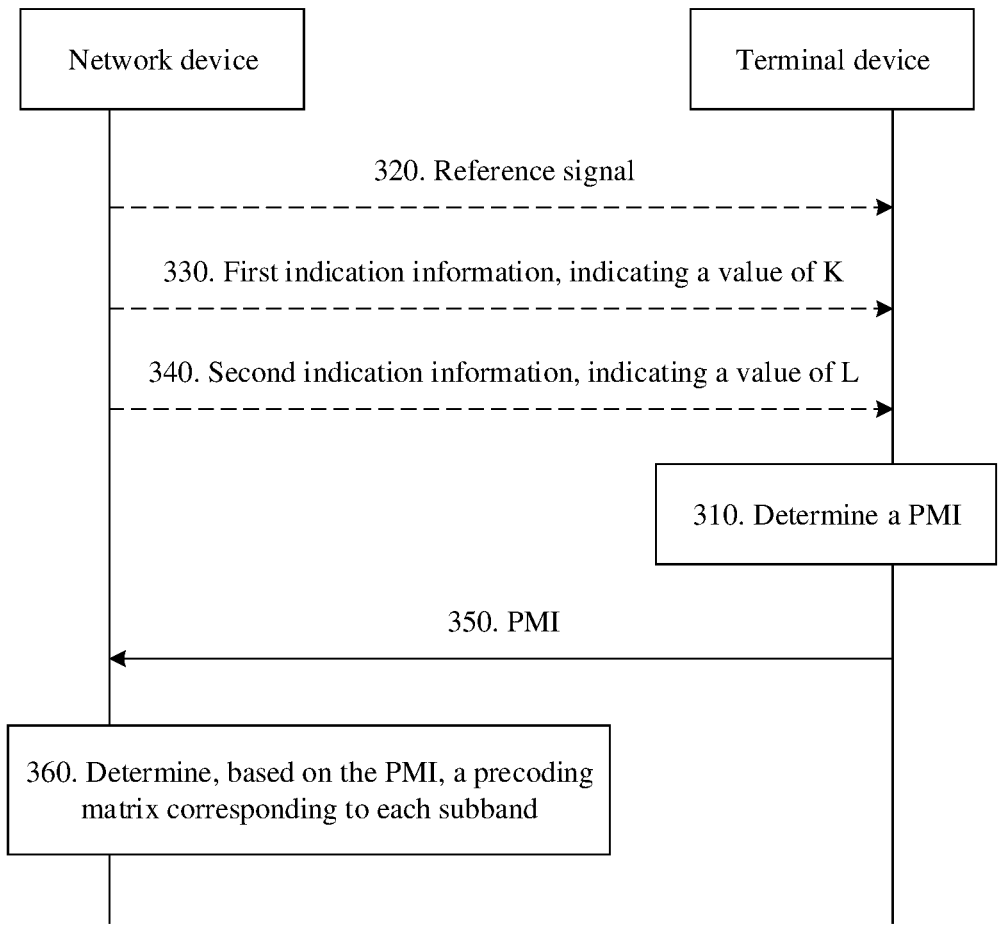
FIG. 3 is a schematic flowchart of a precoding matrix indication and determining method according to an embodiment of this application.

FIG. 3 is a schematic flowchart of a precoding matrix indication and determining method according to an embodiment of this application from a perspective of device interaction. As shown in FIG. 3, the method 300 may include operation 310 to operation 360. The following describes each operation in the method 300 in detail.

In operation 310, a terminal device determines a PMI.

For example, the terminal device may determine the PMI based on an ideal precoding matrix of a wideband and an ideal precoding matrix of each subband, and indicate the ideal precoding matrix of each subband to a network device by using the PMI. In a possible implementation, the terminal device may perform channel measurement based on a received reference signal such as a CSI-RS, and determine the PMI based on the ideal precoding matrix of the wideband and the ideal precoding matrix of each subband that are obtained through measurement.

In one embodiment, before operation 310, the method 300 further includes operation 320: The network device sends a reference signal. Correspondingly, the terminal device receives the reference signal.

Figure 4:
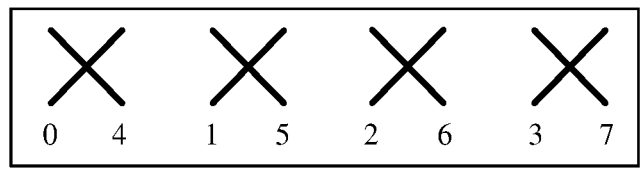
FIG. 4 is a schematic diagram of transmit antennas in different polarization directions according to an embodiment of this application.

The network device may send the reference signal through a plurality of transmit antennas. The plurality of transmit antennas may be transmit antennas in a same polarization direction, or may be transmit antennas in different polarization directions. This is not limited in this application. FIG. 4 is a schematic diagram of transmit antennas in different polarization directions. Specifically, eight transmit antennas are shown in the figure, and the eight transmit antennas correspond to two polarization directions. Antenna ports 0, 1, 2, and 3 are antenna ports in a same polarization direction (for example, denoted as a first polarization direction), and may correspond to a same beam vector, for example, denoted as $\upsilon_1$. Antenna ports 4, 5, 6, and 7 are antenna ports in a same polarization direction (for example, denoted as a second polarization direction), and may correspond to another same beam vector, for example, denoted as $\upsilon_2$, where $\upsilon_1$ and $\upsilon_2$ may be two orthogonal discrete Fourier transform (DFT) vectors, or may be mathematical vectors representing spatial characteristics of electromagnetic waves. This is not particularly limited in this embodiment of this application.

The terminal device may first estimate channel matrices of the wideband and each subband based on the received reference signal, and determine RI, that is, a recommended transmission rank, that is, a recommended quantity of transmission layers. Then, the terminal device may determine the ideal precoding matrix of the wideband based on the channel matrix of the wideband, and may determine the ideal precoding matrix of each subband based on the channel matrix of each subband. A specific process in which the terminal device determines the ideal precoding matrix based on the channel matrix is described in detail above. For brevity, details are not described herein again.

It should be understood that a method for determining the ideal precoding matrix by the terminal device is not limited to the method listed above. The terminal device may alternatively determine the ideal precoding matrix based on a channel state. For example, the terminal device may determine the ideal precoding matrix based on reciprocity between an uplink channel and a downlink channel. This is not limited in this application.

It should be further understood that, in this embodiment, a process of determining RI may be the same as that in the conventional technology. For brevity, detailed descriptions of a specific process of determining the RI are omitted herein. The following embodiment mainly describes in detail a PMI determining process.

The terminal device may determine the PMI based on the ideal precoding matrix of each subband. In this embodiment of this application, the precoding matrix of each subband may be determined based on R groups of space-frequency information corresponding to R transmission layers. Each group of space-frequency information in the R groups of space-frequency information may include space domain information, frequency domain information, and a coefficient. Specifically, an $r^{th}$ ($1 \le r \le R$, and r is an integer) group of space-frequency information may be used to indicate:

P×L space domain vectors corresponding to an $r^{th}$ transmission layer,

K frequency domain vectors corresponding to the $r^{th}$ transmission layer, and P×L×K coefficients corresponding to the $r^{th}$ transmission layer.

The P×L space domain vectors are determined by L beam vectors in each of P polarization directions and wideband amplitude coefficients of the L beam vectors, and each of the P×L×K coefficients is used to indicate a linear superposition coefficient of a vector operation result of one of the P×L space domain vectors and one of the K frequency domain vectors.

In an implementation, the space domain vector is a $(P \times N_{tx}) \times 1$-dimensional column vector, the frequency domain vector is an $N_{sb} \times 1$-dimensional column vector, and the vector operation result includes: a product of the space domain vector and a conjugate transpose of the frequency domain vector, or a Kronecker product of a conjugate of the frequency domain vector and the space domain vector, where $N_{tx}$ is a quantity of antenna ports in each polarization direction, $N_{sb}$ is a quantity of subbands, $1 \le L \le N_{tx}$, $1 \le K \le N_{sb}$, and both $N_{tx}$ and $N_{sb}$ are positive integers.

In another implementation, the space domain vector is a $(P \times N_{tx}) \times 1$-dimensional column vector, the frequency domain vector is a $1 \times N_{sb}$-dimensional row vector, and the vector operation result includes: a product of the space domain vector and the frequency domain vector, or a Kronecker product of a transpose of the frequency domain vector and the space domain vector.

In still another implementation, the space domain vector is a $1 \times (P \times N_{tx})$-dimensional row vector, the frequency domain vector is a $1 \times N_{sb}$-dimensional row vector, and the vector operation result includes: a product of a conjugate transpose of the space domain vector and the frequency domain vector, or a Kronecker product of a transpose of the frequency domain vector and a conjugate transpose of the space domain vector.

In yet another implementation, the space domain vector is a $1 \times (P \times N_{tx})$-dimensional row vector, the frequency domain vector is an $N_{sb} \times 1$-dimensional column vector, and the vector operation result includes: a product of a conjugate transpose of the space domain vector and a conjugate transpose of the frequency domain vector, or a Kronecker product of a conjugate of the frequency domain vector and a conjugate transpose of the space domain vector.

The foregoing lists specific forms of corresponding vector operation results when the beam vector and the frequency domain vector each are in different forms. It may be understood that specific forms of the beam vector and the frequency domain vector are not limited in this application. A person skilled in the art may perform mathematical transformation or equivalent replacement on these beam vectors and frequency domain vectors based on a concept of this embodiment of this application, to achieve a technical effect the same as or similar to that of this application.

For ease of description in the following, it is assumed that the space domain vector is a $(P \times N_{tx}) \times 1$-dimensional column vector, and the frequency domain vector is an $N_{sb} \times 1$-dimensional column vector. Based on specific implementations shown below, a person skilled in the art may also determine a corresponding PMI through mathematical transformation or equivalent replacement, and may determine the precoding matrix of each subband based on the PMI.

In an implementation, the R groups of space-frequency information may be used to determine R space-frequency matrices. Specifically, a space-frequency matrix of the $r^{th}$ transmission layer may be determined based on space-frequency information of the $r^{th}$ transmission layer. Space domain information of the $r^{th}$ transmission layer may be determined by selected space domain beam vectors (for example, L beam vectors, where L≥1 and L is an integer) at the $r^{th}$ transmission layer and wideband amplitude coefficients of the L beam vectors in all polarization directions. Frequency domain information of the $r^{th}$ transmission layer may be determined by selected frequency domain basis vectors (that is, the foregoing frequency domain vectors, for example, K frequency domain vectors, where K≥1 and K is an integer) at the $r^{th}$ transmission layer. The space-frequency matrix of the $r^{th}$ transmission layer may be obtained by linearly superimposing P×L×K component matrices determined by the L beam vectors at the $r^{th}$ transmission layer in the P polarization directions, the wideband amplitude coefficients of the L beam vectors, and the K frequency domain basis vectors. A coefficient of the $r^{th}$ transmission layer may be determined by using a linear superposition coefficient of each component matrix. Each column vector in the ideal precoding matrix of each subband in frequency domain may be represented by using linear combinations of beam vectors in space domain, and weighting coefficients used in the linear combinations of the beam vectors may be described by using linear combinations of the K frequency domain basis vectors. Each frequency domain basis vector may be used to represent a change rule of a weighting coefficient on a plurality of subbands in frequency domain.

It should be noted that, in this embodiment, for ease of differentiation and description, a frequency domain vector from a second vector set is referred to as a frequency domain basis vector. In addition, the following further describes a frequency domain column vector. The frequency domain column vector may be a frequency domain basis vector directly determined from the second vector set, or may be a product of a frequency domain basis vector and an amplitude coefficient. Therefore, in this embodiment, dimensions of the frequency domain basis vector and the frequency domain column vector may be the same. In addition, unless otherwise specified, meanings expressed by the "frequency domain basis vector" and the "frequency domain vector" are the same. For brevity, descriptions of a same or similar case are omitted below.

In this embodiment of this application, L and K determine overheads of the PMI. Values of L and K may be preconfigured by the network device and indicated to the terminal device, or may be predefined, for example, defined in a protocol. Alternatively, the network device may configure one of the values, and the protocol defines the other value. Alternatively, the values of L and K may be determined by the terminal device and then reported to the network device. Alternatively, the network device may preconfigure a plurality of candidate values for the terminal device, and the terminal device selects one of the plurality of candidate values preconfigured by the network device and reports the value to the network device. This is not limited in this application.

When K is configured by the network device, in one embodiment, the method 300 further includes: Step 330: The network device sends first indication information, where the first indication information is used to indicate a value of K. Correspondingly, the terminal device receives the first indication information.

When L is configured by the network device, in one embodiment, the method 300 further includes: Step 340: The network device sends second indication information, where the second indication information is used to indicate a value of L. Correspondingly, the terminal device receives the first indication information.

The network device may indicate the values of K and L to the terminal device by using same signaling or different signaling. In other words, the first indication information and the second indication information may be carried in same signaling, or may be carried in different signaling. This is not limited in this application.

In one embodiment, the first indication information is carried in a radio resource control (RRC) message.

In one embodiment, the second indication information is carried in an RRC message.

It should be understood that, that the network device uses the RRC message to carry the first indication information and the second indication information and configures the RRC message for the terminal device is merely a possible implementation, and should not constitute any limitation on this application. When K and L are configured by the network device, the network device may alternatively use other signaling to carry at least the first indication information or the second indication information, for example, a MAC CE or DCI. This is not limited in this application. In addition, the first indication information and the second indication information may be carried in same signaling, or may be carried in different signaling. This is not limited in this application.

For ease of understanding and description of this embodiment of this application, it is assumed in the following that a quantity of polarization directions of transmit antennas is P, a quantity of ports of transmit antennas in each polarization direction is $N_{tx}$, a quantity of ports of receive antennas in each polarization direction is $N_{rx}$, a quantity of transmission layers is R, $N_{tx}>1$, $N_{rx}\geq 1$, R≥1, P≥1, and R, P, $N_{tx}$, $N_{rx}$ are all integers.

In this embodiment, the space-frequency matrix may be, for example, a $(P \times N_{tx}) \times N_{sb}$-dimensional matrix. Each column vector in the matrix may correspond to one subband. An $n_{sb}^{th}$ ($1 \leq n_{sb} \leq N_{sb}$, and $n_{sb}$ is an integer) column vector in each of the R space-frequency matrices is extracted, to obtain R $N_{tx} \times 1$-dimensional column vectors. R $(P \times N_{tx}) \times 1$-dimensional column vectors are arranged from left to right in an order from the first transmission layer to the $R^{th}$ transmission layer, to obtain a $(P \times N_{tx}) \times R$-dimensional matrix, and the matrix is a precoding matrix corresponding to an $n_{sb}^{th}$ subband.

The space-frequency matrix may also be, for example, a $(P \times N_{tx} \times N_{sb}) \times 1$-dimensional column vector. The column vector includes a plurality of groups of elements corresponding to a plurality of subbands. For example, the first element to the $(P \times N_{tx})^{th}$ element correspond to the first subband, the $(P \times N_{tx}+1)^{th}$ element to the $(2P \times N_{tx})^{th}$ element may correspond to the second subband, and so on. The last $P \times N_{tx}$ elements may correspond to the $N_{sb}^{th}$ subband. $P \times N_{tx}$ elements that are in each of the R space-frequency matrices and that correspond to an $n_{sb}^{th}$ subband are extracted, to obtain R $(P \times N_{tx}) \times 1$-dimensional column vectors. The R $(P \times N_{tx}) \times 1$-dimensional column vectors are arranged from left to right in an order from the first transmission layer to the $R^{th}$ transmission layer, to obtain a $(P \times N_{tx}) \times R$-dimensional matrix, and the matrix is a precoding matrix corresponding to the $n_{sb}^{th}$ subband.

It should be noted that the space-frequency matrix described above is an intermediate value in a process in which the terminal device determines the PMI. The terminal device may determine, based on the channel matrix of each subband, the space domain information, the frequency domain information, and the weighting coefficient corresponding to each transmission layer, but does not necessarily generate the space-frequency matrix.

For ease of understanding, the following describes in detail a process in which the terminal device determines the PMI by using an example in which a $(P \times N_{tx}) \times N_{sb}$-dimensional matrix is used as the space-frequency matrix. However, this should not constitute any limitation on this application. For example, the terminal device may determine only column vectors used to generate the space-frequency matrix. After obtaining the space domain information and the frequency domain information corresponding to each transmission layer, the terminal device may generate the PMI that can be used to determine the precoding matrix of each subband. In addition, the $(P \times N_{tx} \times N_{sb}) \times 1$-dimensional column vector may be obtained through matrix transformation of $(P \times N_{tx}) \times N_{sb}$. A specific process of determining the $(P \times N_{tx} \times N_{sb}) \times 1$-dimensional column vector is similar to a specific process of determining the $(P \times N_{tx}) \times N_{sb}$-dimensional matrix. In the process of determining the $(P \times N_{tx}) \times N_{sb}$-dimensional matrix, a person skilled in the art may obtain the $(P \times N_{tx} \times N_{sb}) \times 1$-dimensional column vector through simple mathematical transformation or replacement.

For ease of understanding and description of this embodiment, the following describes in detail a specific process in which the terminal device determines the PMI with reference to a specific implementation. It should be understood that the following lists two implementations in which the terminal device determines the PMI, including an implementation 1 and an implementation 2. However, this should not constitute any limitation on this application. A specific implementation of determining the PMI by the terminal device is not limited in this application.

Implementation 1

Step (i):

The terminal device determines the ideal precoding matrix of the wideband based on the channel matrix of each subband.

Specifically, the terminal device may determine a covariance matrix of a channel matrix of each subband based on the channel matrix of each subband, and then perform SVD on a sum of the covariance matrices corresponding to the subbands, to obtain the ideal precoding matrix of the wideband.

For example, a dimension of the channel matrix H of each subband is $(P \times N_{tx} N_{rx}) \times N_{rx}$. P represents a quantity of polarization directions, $P \geq 1$, and P is an integer. A dimension of the covariance matrix $HH^H$ that is of the channel matrix of each subband and that is determined based on the channel matrix of each subband is $(P \times N_{tx}) \times (P \times N_{tx})$. The ideal precoding matrix of the wideband may be obtained by performing SVD on a sum of the covariance matrices of the channel matrices of all the subbands. A dimension of the ideal precoding matrix may be $(P \times N_{tx}) \times R$. For each transmission layer, the ideal precoding matrix of the wideband may correspond to a $(P \times N_{tx}) \times 1$-dimensional column vector at the transmission layer. For ease of description, the $(P \times N_{tx}) \times 1$-dimensional column vector is denoted as an ideal precoding vector of the wideband in the following.

Then, the terminal device may determine a corresponding space-frequency matrix based on each transmission layer. For ease of description, a specific process in which the terminal device determines the space-frequency matrix is described in detail in the following operations (including operation ii to operation v) based on the $r^{th}$ ($1 \leq r \leq R$, and r is an integer) transmission layer. The terminal device may select, in a traversing manner, each of 1 to R as a value of r, and repeatedly perform the following operation ii to operation iv, to obtain R groups of indication information used to indicate the R space-frequency matrices corresponding to the R transmission layers. In other words, the PMI may include the R groups of indication information corresponding to the R transmission layers, and each group of indication information may be used to indicate one space-frequency matrix.

Step (ii):

The terminal device projects an ideal precoding vector of the wideband at the $r^{th}$ h transmission layer to a space domain, to obtain $P \times L$ space domain column vectors at the $r^{th}$ transmission layer.

L beam vectors at any one of the R transmission layers may be the same as or different from L beam vectors at another of the R transmission layers. This is not limited in this application.

In addition, L beam vectors in any one of the P polarization directions may be the same as or different from L beam vectors in another of the P polarization directions. This is not limited in this application.

If L beam vectors at any one of the R transmission layers are the same as L beam vectors at another of the R transmission layers, and L beam vectors in any one of the P polarization directions may be the same as L beam vectors in another of the P polarization directions, the terminal device may first determine the L beam vectors, and then separately determine wideband amplitude coefficients of the L beam vectors in the P polarization directions at each transmission layer. For example, the L beam vectors may be denoted as $v_0, v_1, \ldots, v_{L-1}$, P=2, wideband amplitude coefficients of the L beam vectors in the first polarization direction at the $r^{th}$ transmission layer may be denoted as $a_0, a_1, \ldots, a_{L-1}$, and wideband amplitude coefficients of the L beam vectors in the second polarization direction at the $r^{th}$ transmission layer may be denoted as $a_L, a_{L+1}, \ldots, a_{2L-1}$. Therefore, products of the L beam vectors in the P polarization directions at the $r^{th}$ transmission layer and the corresponding wideband amplitude coefficients may be obtained as follows: $a_0 v_0, a_1 v_1, \ldots, a_{L-1} v_{L-1}, a_L v_0, a_{L+1} v_1, \ldots, a_{2L-1} v_{L-1}$. For ease of differentiation and description, in this embodiment, a product of a beam vector and a corresponding wideband amplitude coefficient is referred to as an intermediate vector. It may be understood that one intermediate vector may be determined by one beam vector and a wideband amplitude coefficient corresponding to the beam vector, and one intermediate vector may be used to determine one space domain column vector. A dimension of the intermediate vector may be $N_{tx} \times 1$. A dimension of a space domain column vector determined in such way may be $(P \times N_{tx}) \times 1$.

If L beam vectors at any one of the R transmission layers are different from L beam vectors at another of the R transmission layers, the terminal device may separately determine the L beam vectors in the P polarization directions at each transmission layer and corresponding wideband amplitude coefficients. Similarly, if L beam vectors in any one of the P polarization directions are different from L beam vectors in another of the P polarization directions, the terminal device may separately determine L beam vectors in each polarization direction and corresponding wideband amplitude coefficients. Manners in which the terminal device determines L beam vectors at all transmission layers and in all polarization directions may be the same.

For ease of description in the following, it is assumed that L beam vectors at any one of the R transmission layers are the same as L beam vectors at another of the R transmission layers, and L beam vectors in any one of the P polarization directions are the same as L beam vectors in another of the P polarization directions. The terminal device may determine L beam vectors based on a transmission layer and a polarization direction, and then determine wideband amplitude coefficients of the L beam vectors in the P polarization directions at the $r^{th}$ h transmission layer.

The transmission layer used to determine the L beam vectors may be any one of the R transmission layers, for example, may be the first transmission layer, or may be the $R^{th}$ transmission layer. The transmission layer used to determine the L beam vectors may be a pre-specified transmission layer, for example, defined in a protocol, or may be a transmission layer indicated by the network device. For ease of description, the following uses the $r^{th}$ transmission layer as an example to describe a specific process in which the terminal device determines the L beam vectors and the wideband amplitude coefficients of the L beam vectors.

A polarization direction used to determine the L beam vectors may be any one of the P polarization directions, for example, may be the first polarization direction, or may be the $P^{th}$ polarization direction. The polarization direction used to determine the L beam vectors may be a pre-specified polarization direction, for example, defined in a protocol, or may be a polarization direction indicated by the network device. For ease of description, the following uses the $r^{th}$ transmission layer and the $p^{th}$ polarization direction as examples to describe a specific process in which the terminal device determines the L beam vectors, and uses the $r^{th}$ transmission layer as an example to describe a specific process in which the terminal device determines the wideband amplitude coefficients of the L beam vectors in the P polarization directions.

First, the terminal device may project the ideal precoding vector of the wideband at the $r^{th}$ transmission layer to the space domain, to obtain the L beam vectors in space domain and the wideband amplitude coefficients of the L beam vectors.

Specifically, the terminal device may determine the L beam vectors in space domain and the wideband amplitude coefficients of the L beam vectors based on a first vector set and the ideal precoding vector of the wideband at the $r^{th}$ transmission layer.

The first vector set may include a plurality of $N_{tx} \times 1$-dimensional column vectors, and each column vector is a two-dimensional (2D)-DFT vector or an oversampled 2D-DFT vector. 2D may represent two different directions, for example, a horizontal direction and a vertical direction.

In a possible design, the first vector set may include $N_{tx}$ column vectors, and any two of the $N_{tx}$ column vectors are orthogonal to each other. The terminal device may select L column vectors from the $N_{tx}$ column vectors as the L selected beam vectors in space domain.

Specifically, the terminal device may calculate inner products of an ideal precoding vector in a polarization direction (for example, a $p^{th}$ polarization direction) of the ideal precoding vector of the wideband and the column vectors in the first vector set, to obtain a plurality of values. It may be understood that the plurality of values are complex numbers. The terminal device may further determine L values with larger moduli from the plurality of values. A modulus of any one of the L values is greater than a modulus of any one of remaining $N_{tx}$-L values. L column vectors in the first vector set that are used to generate the L values may be used as the L beam vectors in space domain.

In another possible design, the first vector set may include $O_1 \times O_2 \times N_{tx}$ column vectors, where $O_1$ and $O_2$ are oversampling factors, $O_1 \geq 1$, $O_2 \geq 1$, $O_1$ and $O2$ are not 1 at the same time, and both are integers. The first basis vector may include $O_1 \times O_2$ subsets, each subset includes $N_{tx}$ column vectors, and any two column vectors in each subset are orthogonal to each other. The terminal device may select a subset from the $O_1 \times O_2$ subsets, and the selected subset includes the L selected beam vectors.

A dimension of the ideal precoding vector of the wideband in each polarization direction is also $N_{tx} \times 1$. The terminal device may calculate inner products of an ideal precoding vector of the wideband in a polarization direction (for example, a $p^{th}$ polarization direction) and $N_{tx}$ column vectors in the $O_1 \times O_2$ subsets in the first vector set, to obtain $O_1 \times O_2$ groups of values, and each group of values includes $N_{tx}$ values. The terminal device may determine L values with relatively large moduli from each group of values, and may further compare the $O_1 \times O_2$ groups of L values, to select a group of values. Moduli of L values in the selected group of values are greater than moduli of L values in any group of remaining $O_1 \times O_2 - 1$ groups of values. The L column vectors in the first vector set that are used to generate the group of values may be the L beam vectors in space domain. It may be understood that the L beam vectors belong to one of the foregoing $O_1 \times O_2$ subsets, for example, the subset may be denoted as a first subset.

Because transmit antennas in the P polarization directions are configured, the terminal device may select, in a traversing manner, each of 1 to P as a value of p, and repeatedly perform the following operation, to obtain L wideband amplitude coefficients in each of the P polarization directions: Moduli of values of inner products of the ideal precoding vector of the wideband in the $p^{th}$ polarization direction of the P polarization directions and the foregoing determined L beam vectors may be used as wideband amplitude coefficients of the L column vectors in the $p^{th}$ polarization direction. The terminal device may obtain L wideband amplitude coefficients in each of the P polarization directions, that is, P×L wideband amplitude coefficients, by repeatedly performing the foregoing operation.

The terminal device may further determine P×L intermediate vectors. First, the terminal device may select, in a traversing manner, each of [1, P] as a value of p, to sequentially obtain L intermediate vectors in each of the P polarization directions. Values of L intermediate vectors in the $p^{th}$ polarization direction may be obtained by selecting, in a traversing manner, each of 1 to L as a value of l and repeatedly performing the following operation: multiplying an $l^{th}$ beam vector in the L beam vectors by an $l^{th}$ wideband amplitude coefficient in the L wideband amplitude coefficients in the $p^{th}$ polarization direction, to obtain an $l^{th}$ intermediate vector in the $p^{th}$ polarization direction. The terminal device may obtain the L intermediate vectors in the $p^{th}$ polarization direction by repeatedly performing the foregoing operation.

Then, the terminal device may determine the P×L space domain column vectors based on the P×L intermediate vectors. As described above, a dimension of each intermediate vector is $N_{rx}×1$, a dimension of a matrix formed by L intermediate vectors in each polarization direction may be $N_{rx}×L$, and a dimension of a matrix formed by the P×L intermediate vectors in the P polarization directions may be $(P×N_{rx})×(P×L)$. For ease of description, the matrix formed by the P×L intermediate vectors in the P polarization directions may be denoted as a space matrix $W_1$ below, and each column vector in the space matrix $W_1$ is referred to as a space domain column vector.

For example, it is assumed that P=2, L intermediate vectors in a first polarization direction are $a_0 v_0, a_1 v_1, \ldots, a_{L-1} v_{L-1}$, and L space domain column vectors in a second polarization direction are $a_L v_0, a_{L+1} v_1, \ldots, a_{2L-1} v_{L-1}$. Therefore, the space matrix $W_1$ formed based on the intermediate vectors in the P polarization directions may be as follows:

$$W_1 = \begin{bmatrix} a_0 v_0, a_1 v_1, \ldots \ldots, a_{L-1} v_{L-1} & 0 \\ 0 & a_L v_0, a_{L+1} v_1, \ldots \ldots, a_{2L-1} v_{L-1} \end{bmatrix},$$

where $a_0$ to $a_{2L-1}$ represent wideband amplitude coefficients, and $v_0$ to $v_{L-1}$ represent beam vectors. In other words, elements in a $((p-1)×L+1)^{th}$ column to a $(p×L)^{th}$ column and a $p^{th}$ row to a $(p×N_{rx})^{th}$ row in the space matrix may be determined by the L intermediate vectors in the $p^{th}$ polarization direction, and may be obtained by multiplying the L beam vectors by the L wideband amplitude coefficients in the $p^{th}$ polarization direction.

The space matrix may be a representation form of space domain information of the $r^{th}$ transmission layer.

It should be understood that the foregoing process is merely shown for ease of understanding, and the terminal device does not necessarily generate the space matrix in a process of determining the P×L space domain column vectors. The terminal device may directly determine intermediate vectors in different polarization directions based on the L beam vectors and corresponding wideband amplitude coefficients in the different polarization directions. For example, the terminal device may determine the L intermediate vectors based on the wideband amplitude coefficients in the $p^{th}$ polarization direction and the L beam vectors, and may determine the space domain column vector based on a dimension of the space domain column vector. In the space domain column vector, elements in a $p^{th}$ row to a $(p×N_{rx})^{th}$ row are elements in the L intermediate vectors, and elements in a row other than the $p^{th}$ row to the $(p×N_{rx})^{th}$ row may be zero. Based on the foregoing process, the terminal device may determine the P×L space domain column vectors based on the wideband amplitude coefficients in the P polarization directions and the L beam vectors.

It should be further understood that, the foregoing method for calculating inner products of the ideal precoding vector of the wideband in a polarization direction and all column vectors in the first vector set to determine the L beam vectors, and using the L beam vectors as the beam vectors in the P polarization directions is merely a possible implementation. Alternatively, the terminal device may calculate inner products of the ideal precoding vector of the wideband in each of the P polarization directions and all column vectors in the first vector set, to determine the P×L beam vectors corresponding to the P polarization directions. This is not limited in this application.

Step (iii):

When the terminal device represents an ideal precoding vector of each subband at the $r^{th}$ transmission layer by using linear combinations of the P×L space domain column vectors, the terminal device determines a weighting coefficient of each space domain column vector.

Specifically, the terminal device may determine the corresponding ideal precoding matrix based on the channel matrix of each subband by using the method in the conventional technology. A dimension of the ideal precoding matrix may be $(P×N_{rx})×R$. For each transmission layer, the ideal precoding matrix of each subband may correspond to a $(P×N_{rx})×1$-dimensional column vector at the transmission layer. For ease of description, the $(P×N_{rx})×1$-dimensional column vector is denoted as an ideal precoding vector of the subband in the following.

Then, the terminal device may calculate inner products of an ideal precoding vector of a subband and the P×L space domain column vectors obtained in operation ii, to obtain P×L values. Values obtained by dividing the P×L values by the P×L wideband amplitude coefficients determined in operation ii are weighting coefficients corresponding to the subband. The weighting coefficients may be understood as weighting coefficients of the space domain column vectors used when the ideal precoding vector of the subband is represented by using linear combinations of the P×L space domain column vectors.

If P×L weighting coefficients corresponding to each subband are used as one column vector, $N_{sb}$ column vectors corresponding to the $N_{sb}$ subbands may be obtained. The $N_{sb}$ column vectors are sequentially arranged from left to right in an order of the $N_{sb}$ subbands, to obtain a $(P×L)×N_{sb}$-dimensional matrix. Each column of the matrix corresponds to one subband, and elements in each column is used to represent weighting coefficients of the space domain column vectors used when a corresponding subband is represented by using linear combinations of the P×L space domain column vectors.

Step (iv):

The terminal device determines the K frequency domain basis vectors at the $r^{th}$ transmission layer.

It should be noted that K frequency domain basis vectors at any one of the R transmission layers may be the same as or different from K frequency domain basis vectors at another of the R transmission layers. This is not limited in this application. If K frequency domain basis vectors at any one of the R transmission layers are the same as K frequency domain basis vectors at another of the R transmission layers, there may be K frequency domain basis vectors at the R transmission layers, and the terminal device may determine the K frequency domain basis vectors based on a transmission layer. If K frequency domain basis vectors at any one of the R transmission layers are different from K frequency domain basis vectors at another of the R transmission layers, there may be R×K frequency domain basis vectors at the R transmission layers, and the terminal device may determine K frequency domain basis vectors based on each of the R transmission layers.

For ease of description in the following, assuming that K frequency domain basis vectors at any one of the R transmission layers are the same as K frequency domain basis vectors at another of the R transmission layers, the terminal device may determine the K frequency domain basis vectors based on a transmission layer. The transmission layer used to determine the K frequency domain basis vectors may be any one of the R transmission layers, for example, may be the first transmission layer, or may be the $R^{th}$ transmission layer. The transmission layer used to determine the K frequency domain basis vectors may be a pre-specified transmission layer, for example, defined in a protocol, or may be a transmission layer indicated by the network device. For ease of description, the following uses the $r^{th}$ transmission layer as an example to describe a specific process in which the terminal device determines the K frequency domain basis vectors.

The terminal device may project superposition coefficients of the subbands at the $r^{th}$ transmission layer on the second vector set, to obtain the K frequency domain basis vectors.

The second vector set may include a plurality of $N_{sb} \times 1$-dimensional column vectors, and each column vector is a discrete Fourier transform (DRT) vector, an oversampled DFT vector, a truncation of the discrete Fourier vector, or a truncation of the oversampled DFT vector.

The "truncation" herein may be understood as a vector including some elements extracted from the DFT vector or the oversampled DFT vector. For example, assuming that the DFT vector is a 16-dimensional column vector, the first 10 elements may be extracted to form a 10-dimensional column vector, and the 10-dimensional column vector may be considered as a truncation of the 16-dimensional DFT vector. In this embodiment, a dimension of the truncation may be $N_{sb} \times 1$.

In this embodiment, each column vector in the second vector set may be understood as a change rule in frequency domain. In this embodiment, it is expected that when the ideal precoding vector that is of each subband and that is determined in operation iii is represented by using L beam vectors, weighting coefficients of the L beam vectors are represented by using linear combinations of several (for example, K) frequency domain basis vectors in the second vector set. Therefore, the K frequency domain basis vectors to be determined in operation iv are the several frequency domain basis vectors described above.

In a possible design, the second vector set may include $N_{sb}$ column vectors, and any two of the $N_{sb}$ column vectors are orthogonal to each other. The terminal device may select K column vectors from the $N_{sb}$ column vectors as the K selected basis vectors in frequency domain, that is, the K frequency domain basis vectors.

The terminal device may form the $N_{sb}$ column vectors into an $N_{sb} \times N_{sb}$-dimensional matrix, for example, denoted as F. Then, the terminal device may multiply the $(P \times L) \times N_{sb}$-dimensional matrix obtained in operation iii by the matrix F, to obtain a $(P \times L) \times N_{sb}$-dimensional matrix. $N_{sb}$ values may be obtained by performing modulo operations on $N_{sb}$ columns in the matrix. K values with larger moduli are selected from the $N_{sb}$ values. A modulus of any one of the K values is greater than a modulus of any one of remaining $N_{sb} - K$ values. K columns in the second vector set that are used to generate the K values may be the K selected basis vectors in frequency domain.

In another possible design, the second vector set may include $O_3 \times N_{sb}$ column vectors, where $O_3$ is an oversampling factor, $O_3 \geq 1$, and $O_3$ is an integer. The second vector set may include $O_3$ subsets, each subset includes $N_{sb}$ column vectors, and any two column vectors in each subset are orthogonal to each other. The terminal device may select a subset from the $O_3$ subsets, and the selected subset includes the K selected frequency domain basis vectors.

The terminal device forms the $N_{sb}$ column vectors in each subset into an $N_{sb} \times N_{sb}$-dimensional matrix, for example, denoted as $F_i$ ($1 \leq i \leq O_3$, and i is an integer), to obtain $O_3$ $N_{sb} \times N_{sb}$-dimensional matrices. The terminal device may successively multiply the $(P \times L) \times N_{sb}$-dimensional matrix obtained in operation iii by matrices $F_1$ to $F_{O_3}$, to obtain $O_3$ $(P \times L) \times N_{sb}$-dimensional matrices. A modulo operation is performed on each column in each matrix, to obtain $O_3$ groups of values, and each group of values includes $N_{sb}$ values. The terminal device may select K values with larger moduli from each group of values, and may further compare the $O_3$ groups of K values, to select a group of values. Moduli of K values in the selected group of values are greater than moduli of K values in any one of the remaining $O_3 - 1$ groups of values. Column vectors in the second vector set that are used to generate the K values may be the K selected frequency domain basis vectors in frequency domain. It may be understood that the K frequency domain basis vectors belong to one of the $O_3$ subsets, for example, the subset may be denoted as a second subset.

Step (v):

The terminal device determines $P \times L \times K$ weighting coefficients.

The K frequency domain basis vectors determined by the terminal device in operation iv may form an $N_{sb} \times K$-dimensional matrix.

The terminal device may obtain a $(P \times L) \times K$-dimensional matrix based on the $(P \times L) \times N_{sb}$-dimensional matrix determined in operation iii and the $N_{sb} \times K$-dimensional matrix. For example, the terminal device may obtain the $(P \times L) \times K$-dimensional matrix by multiplying the $(P \times L) \times N_{sb}$-dimensional matrix determined in operation iii by the $N_{sb} \times K$-dimensional matrix. The matrix may be referred to as a coefficient matrix. Each element in the coefficient matrix is a weighting coefficient, and each weighting coefficient may include an amplitude coefficient and a phase coefficient. It may be understood that, $P \times L$ rows in the coefficient matrix correspond to $P \times L$ columns in a space domain column vector, and K columns in the coefficient matrix correspond to K columns in a frequency domain basis vector. That is, coefficients of the $P \times L$ rows are weighting coefficients of the $P \times L$ space domain column vectors, and coefficients of the K columns are weighting coefficients of the K frequency domain basis vectors.

Step (vi):

The terminal device determines the PMI.

The terminal device may determine, based on the $P \times L$ space domain column vectors at the $r^{th}$ transmission layer that are determined in operation ii, the K frequency domain basis vectors at the $r^{th}$ transmission layer that are determined in operation iv, and the $P \times L \times K$ weighting coefficients that are determined in operation v, the R space-frequency matrices corresponding to the R transmission layers.

As described above, the space-frequency matrix may be a $(P \times N_{tx}) \times N_{sb}$-dimensional matrix, or may be a $(P \times N_{tx} \times N_{sb}) \times 1$-dimensional column vector. For example, when the space-frequency matrix is a $(P \times N_{tx}) \times N_{sb}$-dimensional matrix, the space-frequency matrix may be represented as $W = W_1 H V_2^H$.

$W_1$ is determined by P×L (P×$N_{rx}$)×1-dimensional space domain column vectors, H is determined by P×L×K weighting coefficients, and $V_2$ is determined by K $N_{sb}$×1-dimensional frequency domain basis vectors.

Alternatively, $W_1$ is determined by P×L (P×$N_{rx}$)×1-dimensional space domain column vectors, $V_2$ is determined by K $N_{sb}$×1-dimensional frequency domain basis vectors and amplitude coefficients, and H is determined by P×L×K phase coefficients, or is determined by P×L×K phase coefficients and amplitude coefficients. When $V_2$ is determined by the frequency domain basis vectors and the amplitude coefficients, the amplitude coefficients may be amplitude coefficients separated from the weighting coefficients determined in operation v. Specifically, the K frequency domain basis vectors may correspond to K columns in the coefficient matrix, and an amplitude coefficient in a $k^{th}$ column may be allocated to a $k^{th}$ frequency domain basis vector. Then, values obtained by dividing amplitude coefficients in a $k^{th}$ column in an original coefficient matrix by the amplitude coefficient allocated to the $k^{th}$ frequency domain basis vector are used as the amplitude coefficients in the coefficient matrix. The amplitude coefficients may be reserved. In this case, H is determined by the amplitude coefficients and the phase coefficients. Alternatively, all the amplitude coefficients may be set to 1. In this case, H is determined by the phase coefficients.

Therefore, $W_1$ may be a (P×$N_{rx}$)×L-dimensional matrix, H may be a (P×L)×K-dimensional coefficient matrix, and $V_2$ may be an $N_{sb}$×K-dimensional matrix.

The terminal device may determine the PMI based on the foregoing determined space-frequency matrix, or may determine the PMI based on the P×L space domain column vectors at the $r^{th}$ transmission layer that are determined in operation ii, the K frequency domain basis vectors at the $r^{th}$ transmission layer that are determined in operation iv, and the P×L×K weighting coefficients that are determined in operation v. This is not limited in this application.

Specifically, the PMI may include the R groups of indication information corresponding to the R transmission layers. An $r^{th}$ group of indication information in the R groups of indication information may be used to indicate:

P×L space domain column vectors corresponding to the $r^{th}$ transmission layer, and K frequency domain column vectors corresponding to the $r^{th}$ transmission layer, and used to determine P×L×K weighting coefficients of an $r^{th}$ space-frequency matrix.

The P×L space domain column vectors are determined based on the L beam vectors in the first vector set and the L wideband amplitude coefficients in each of the P polarization directions that are described in operation ii. In other words, a non-zero element in the space domain column vectors may be determined by products of the L beam vectors and the L wideband amplitude coefficients in the polarization directions. A dimension of each space domain column vector may be (P×$N_{rx}$)×1.

The K frequency domain column vectors may be determined by the K frequency domain basis vectors in frequency domain described in operation iv, and the P×L×K weighting coefficients may be determined by the weighting coefficients described in operation v. In other words, the frequency domain column vectors may be the K frequency domain basis vectors determined based on the second vector set. Alternatively, the K frequency domain column vectors may be determined by the K frequency domain basis vectors in frequency domain described in operation iv and the amplitude coefficients in the weighting coefficients described in operation v, and the P×L×K weighting coefficients may be determined by the phase coefficients in the weighting coefficients described in operation v. In other words, the frequency domain column vector may alternatively be K column vectors determined by multiplying the K frequency domain basis vectors by amplitude coefficients of the frequency domain basis vectors. A dimension of each frequency domain column vector may be $N_{sb}$×1.

Specifically, the K frequency domain column vectors may be the K frequency domain basis vectors selected from the second vector set described above. In this case, the P×L×K weighting coefficients may include amplitude coefficients and phase coefficients of the K beam vectors. The K frequency domain column vectors may also be frequency domain column vectors formed by products of the K frequency domain basis vectors and K amplitude coefficients. In this case, the P×L×K weighting coefficients may include only phase coefficients of the K frequency domain basis vectors. Each weighting coefficient may be used to indicate a weight, in the $r^{th}$ space-frequency matrix, of a product of one of the P×L space domain column vectors and a conjugate transpose of one of the K frequency domain column vectors, or a weight, in the $r^{th}$ space-frequency matrix, of a Kronecker product of a conjugate of a frequency domain column vector and a space domain column vector.

Assuming that an $l^{th}$ space domain column vector is denoted as $v_l$, a $k^{th}$ frequency domain column vector is denoted as $u_k$, and a weighting coefficient corresponding to the $l^{th}$ space domain column vector and the k frequency domain column vector are denoted as $g_{l,k}$, the weighting coefficient $g_{l,k}$ may represent a weight of $v_1 u_2^H$ in the $r^{th}$ space-frequency matrix, or may represent a weight of $u_2^* \otimes v_1$ in the $r^{th}$ space-frequency matrix.

As described above, L beam vectors at any transmission layer may be the same as or different from L beam vectors at another transmission layer. K frequency domain basis vectors at any transmission layer may be the same as or different from K frequency domain basis vectors at another transmission layer.

When L beam vectors at any transmission layer are the same as L beam vectors at another transmission layer, and K frequency domain basis vectors at any transmission layer are the same as K frequency domain basis vectors at another transmission layer, the L beam vectors and the K frequency domain basis vectors may not be repeatedly indicated in each group of indication information.

In this case, the PMI may specifically include:

indexes of the L beam vectors, indication information of R groups of wideband amplitude coefficients, indexes of the K frequency domain basis vectors, and indication information of R groups of weighting coefficients.

Each group wideband amplitude coefficients in the R groups of wideband amplitude coefficients includes P×L coefficients, and each group of weighting coefficients in the R groups of weighting coefficients includes P×L×K coefficients.

When L beam vectors at any transmission layer are different from L beam vectors at another transmission layer, and K frequency domain basis vectors at any transmission layer are different from K frequency domain basis vectors at another transmission layer, the L beam vectors and the K frequency domain basis vectors may also be separately indicated in each group of indication information.

In this case, the PMI may include R groups of indication information, and an $r^{th}$ group of indication information in the R groups of indication information may specifically include:

indexes of L beam vectors corresponding to the $r^{th}$ transmission layer, indication information of P×L wideband amplitude coefficients corresponding to the $r^{th}$ transmission layer, indexes of K frequency domain column vectors corresponding to the $r^{th}$ transmission layer, and indication information of P×L×K weighting coefficients.

It should be further understood that the foregoing listed specific content included in the PMI is merely an example, and should not constitute any limitation on this application. For example, L beam vectors at any transmission layer may be the same as L beam vectors at another transmission layer, and K frequency domain basis vectors at any transmission layer may be different from K frequency domain basis vectors at another transmission layer. In this case, the PMI may include indexes of the L beam vectors and indexes of the K frequency domain basis vectors corresponding to each of the R transmission layers. This is not limited in this application.

As described above, the first vector set may be extended to $O_1 \times O_2 \times N_{tx}$ column vectors by using oversampling factors, and the L selected beam vectors in space domain may be from a subset of the $O_1 \times O_2 \times N_{tx}$ column vectors, that is, the first subset described above. Therefore, the PMI may further include indication information used to indicate the first subset, to indicate positions, in the first vector set, of the column vectors in the first subset.

For example, the first vector set may include $O_1 \times O_2$ groups, and each group is a subset. The L beam vectors may be from one of the $O_1 \times O_2$ groups. The indication information of the first subset may be, for example, indexes of a group in which the L beam vectors are located in the $O_1 \times O_2$ groups.

Similarly, the second vector set may also be extended to $O_3 \times N_{sb}$ column vectors by using an oversampling factor, and the K selected frequency domain basis vectors in frequency domain may be from a subset of the $O_3 \times N_{sb}$ column vectors, that is, the second subset described above. Therefore, the PMI may further include indication information used to indicate the second subset, to indicate positions, in the second vector set, of the column vectors in the second subset.

For example, the second vector set may include $O_3$ groups, and each group is a subset. The K beam vectors may be from one of the $O_3$ groups. The indication information of the second subset may be, for example, an index, in the $O_3$ groups, of a group in which the K beam vectors are located.

In one embodiment, the P×L wideband amplitude coefficients corresponding to the $r^{th}$ transmission layer may be indicated in a normalization manner.

Specifically, the terminal device may first determine a largest value in the P×L wideband amplitude coefficients. Ratios of remaining P×L−1 wideband amplitude coefficients to the largest value are calculated by using the largest value as a reference. Indication information of the P×L wideband amplitude coefficients may include an index of a quantized value of the largest value and indexes of quantized values of the ratios of the remaining P×L−1 wideband amplitude coefficients to the largest value.

It should be understood that indicating the P×L wideband amplitude coefficients in the normalization manner is merely a possible implementation, and should not constitute any limitation on this application. For example, the terminal device may also indicate indexes of quantized values of the P×L wideband amplitude coefficients, or indicate the P×L wideband amplitude coefficients in a differential manner. A specific method for indicating the P×L wideband amplitude coefficients by the terminal device is not limited in this application.

In one embodiment, the P×L×K weighting coefficients may be represented in a form of a matrix, for example, may be a (P×L)×K-dimensional matrix. For ease of differentiation and description, a matrix formed by the P×L×K weighting coefficients may be referred to as a coefficient matrix. P×L rows in the coefficient matrix may correspond to P×L column vectors in space domain, and K columns in the coefficient matrix may correspond to K column vectors in frequency domain.

In one embodiment, the P×L×K weighting coefficients corresponding to the $r^{th}$ h transmission layer may be indicated in a normalization manner.

In an implementation, the terminal device may determine a weighting coefficient with a largest amplitude (for example, denoted as a largest coefficient) from the P×L×K weighting coefficients, and indicate a position (for example, sequence numbers of a row and a column of the largest coefficient in the coefficient matrix) of the largest coefficient in the coefficient matrix. Then, the terminal device may further indicate a relative value of a weighting coefficient (for example, denoted as an intra-row largest coefficient) with a largest amplitude in each row in the coefficient matrix relative to the largest coefficient, and a relative value of another weighting coefficient in each row relative to the intra-row largest coefficient in the same row. Alternatively, the terminal device may further indicate a relative value of a weighting coefficient (for example, denoted as an intra-column largest coefficient) with a largest amplitude in each column in the coefficient matrix relative to the largest coefficient, and a relative value of another weighting coefficient in each column relative to the intra-column largest coefficient in the same column.

In another implementation, the terminal device may determine a weighting coefficient with a largest amplitude (for example, the largest coefficient) from the P×L×K weighting coefficients, and indicate a position (for example, sequence numbers of a row and a column of the largest coefficient in the coefficient matrix) of the largest coefficient in the coefficient matrix. Then, the terminal device may further indicate a relative value of another weighting coefficient in the coefficient matrix relative to the largest coefficient.

It should be understood that indicating the P×L×K weighting coefficients in a normalization manner is merely a possible implementation, and should not constitute any limitation on this application. For example, the terminal device may directly indicate indexes of quantized values of the P×L×K weighting coefficients, or indicate the P×L×K weighting coefficients in a differential manner. A specific method for indicating the P×L×K weighting coefficients by the terminal device is not limited in this application.

Each of the P×L×K weighting coefficients may include an amplitude coefficient and a phase coefficient. The amplitude coefficients each may correspond to same feedback overheads. For example, the terminal device may feed back an amplitude coefficient by using $t_0$ ($t_0 \geq 1$, and $t_0$ is an integer) bits. The phase coefficients each may correspond to same feedback overheads. For example, the terminal device may feed back an amplitude coefficient by using $b_0$ ($b_0 \geq 1$, and $b_0$ is an integer) bits.

To reduce PMI feedback overheads, the terminal device may at least allocate different feedback overheads to different amplitude coefficients, or allocate different feedback overheads to different phase coefficients. For example, the terminal device may quantize, by using a relatively large quantity of bits, a row in the coefficient matrix corresponding to a space domain column vector with a relatively large wideband amplitude coefficient, for example, at least feed back an amplitude coefficient by using $t_1$ ($t_1 > t_0$, and $t_1$ is an integer) bits, or feed back a phase coefficient by using $b_1$ ($b_1 > b_0$, and $b_1$ is an integer) bits. Alternatively, the terminal device may quantize, by using a relatively small quantity of bits, a row in the coefficient matrix corresponding to a space domain column vector with a relatively small wideband amplitude coefficient, for example, at least feed back an amplitude coefficient by using $t_2$ ($0 < t_2 < t_0$, and $t_2$ is an integer) bits, or feed back a phase coefficient by using $b_2$ ($0 < b_2 < b_0$, and $b_2$ is an integer) bits.

It should be understood that when the terminal device quantizes some rows in the coefficient matrix by using a relatively large quantity of bits, the terminal device may quantize an amplitude coefficient, a phase coefficient, or the amplitude coefficient and the phase coefficient by using a relatively large quantity of bits. When the terminal device quantizes some columns in the coefficient matrix by using a relatively small quantity of bits, the terminal device may quantize an amplitude coefficient, a phase coefficient, or the amplitude coefficient and the phase coefficient by using a relatively small quantity of bits. This is not limited in this application.

For example, M columns with relatively large wideband amplitude coefficients may be determined from the P×L space domain column vectors, and a quantity of quantized bits of M rows corresponding to the M columns in the coefficient matrix may be greater than a quantity of quantized bits of remaining P×L−M rows. M≥1, and M is an integer. A value of M may be indicated by the network device, or may be predefined, for example, defined in a protocol, or may be determined by the terminal device and fed back to the network device. This is not limited in this application.

In one embodiment, at least two of the L beam vectors correspond to different quantities of frequency domain basis vectors.

For each polarization direction, the L beam vectors may correspond to L rows in the coefficient matrix, and the K frequency domain basis vectors may correspond to K columns in the coefficient matrix. The $l^{th}$ beam vector in the L beam vectors corresponds to an $l^{th}$ row in the coefficient matrix, and k coefficients in the $l^{th}$ row correspond to K frequency domain basis vectors. Different beam vectors may correspond to different quantities of frequency domain basis vectors. For example, the $l^{th}$ beam vector corresponds to K frequency domain basis vectors, and an $(l+1)^{th}$ beam vector may correspond to K' ($1 \leq K' < K$) frequency domain basis vectors.

Because wideband amplitude coefficients of the L beam vectors are different, a beam vector with a larger wideband amplitude coefficient may correspond to a larger quantity of frequency domain basis vectors in frequency domain, and a beam vector with a smaller wideband amplitude coefficient may correspond to a smaller quantity of frequency domain basis vectors in frequency domain. A beam vector with a larger wideband amplitude coefficient has a larger weight in a linear combination, and therefore has greater impact on approximation precision. Therefore, more frequency domain basis vectors may be allocated to a beam vector with a larger wideband amplitude coefficient in frequency domain, to describe, by using linear combinations of more frequency domain basis vectors, weighting coefficients used in linear combinations of these beam vectors, thereby helping improve approximation precision of the PMI.

As described above, because a dimension of the coefficient matrix is (P×L)×K, the L space domain beam vectors may be projected to different quantities of beam vectors in frequency domain by controlling a quantity of non-zero elements in row vectors that are in the coefficient matrix and that correspond to the L space domain beam vectors.

For example, M columns with relatively large wideband amplitude coefficients may be determined from the P×L space domain column vectors, the M columns correspond to M rows in the coefficient matrix, elements in the M rows may all be non-zero elements, and each of remaining P×L−M rows may include one or more zero elements. If an element in the coefficient matrix is zero, it indicates that a sequence number (for example, an $m^{th}$ column) of a column of the zero element in the coefficient matrix may correspond to a column sequence number in K frequency domain column vectors. That is, an $m^{th}$ column vector in the K frequency domain column vectors is not used, so that a quantity of frequency domain basis vectors can be controlled.

In one embodiment, at least two of the R transmission layers correspond to different quantities of beam vectors.

For example, a quantity of beam vectors at a first transmission layer may be configured as L, and a quantity of beam vectors at another transmission layer may be configured as L', where is $1 \leq L' < L$, and L' is an integer.

In one embodiment, at least two of the R transmission layers correspond to different quantities of frequency domain column vectors.

For example, a quantity of frequency domain column vectors at a first transmission layer may be configured as K, and a quantity of frequency domain column vectors at another transmission layer may be configured as K', where $1 \leq K' < K$, and K' is an integer.

In one embodiment, at least two of the R transmission layers correspond to different quantities of beam vectors, and at least two of the R transmission layers correspond to different quantities of frequency domain column vectors.

For example, a quantity of beam vectors at a first transmission layer is configured as L, a quantity of frequency domain column vectors at the first transmission layer is configured as K, a quantity of beam vectors at another transmission layer is configured as L', and a quantity of frequency domain column vectors at another transmission layer is configured as K', where $1 \leq L' < L$, $1 \leq K' < K$, and L' and K are integers.

It should be understood that the foregoing listed plurality of possible quantization manners of the PMI should not constitute any limitation on this application. Specific quantization manners of a space domain column vector, a frequency domain column vector, and a weighting coefficient of each transmission layer are not limited in this application.

Implementation 2

Step (i):

The terminal device determines the ideal precoding matrix of each subband based on the channel matrix of each subband.

Specifically, the terminal device may determine the corresponding ideal precoding matrix based on the channel matrix of each subband by using the method in the conventional technology. A dimension of the ideal precoding matrix may be $(P \times N_{rx}) \times R$. For each transmission layer, the ideal precoding matrix of each subband may correspond to a $(P \times N_{rx}) \times 1$-dimensional column vector at the transmission layer. For ease of description, the $(P \times N_{tx}) \times 1$-dimensional column vector is denoted as an ideal precoding vector of the subband in the following.

Step (ii):

The terminal device determines the P×L beam vectors, the K frequency domain basis vectors, and the P×L×K weighting coefficients corresponding to the $r^{th}$ transmission layer.

As described above, L beam vectors at any one of the R transmission layers may be the same as or different from L beam vectors at another of the R transmission layers. If L beam vectors at any one of the R transmission layers are the same as L beam vectors at another of the R transmission layers, the terminal device may determine the L beam vectors based on a transmission layer. If L beam vectors at any one of the R transmission layers are different from L beam vectors at another of the R transmission layers, the terminal device may determine corresponding L beam vectors based on each transmission layer. It should be understood that a specific process in which the terminal device determines the L beam vectors based on a transmission layer may be the same.

L beam vectors in any one of the P polarization directions may be the same as or different from L beam vectors in another of the P polarization directions. If L beam vectors in any one of the P polarization directions are the same as L beam vectors in another of the P polarization directions, the terminal device may determine the L beam vectors based on a polarization direction. If L beam vectors in any one of the P polarization directions are different from L beam vectors in another of the P polarization directions, the terminal device may determine L beam vectors based on each polarization direction.

In this embodiment, it is assumed that L beam vectors in any one of the P polarization directions are the same as L beam vectors in another of the P polarization directions. Therefore, P=1 in the P×L beam vectors corresponding to the $r^{th}$ transmission layer, that is, the $r^{th}$ transmission layer corresponds to L beam vectors.

It should be understood that when L beam vectors in any one of the P polarization directions are the same as L beam vectors in another of the P polarization directions, the terminal device may determine the L beam vectors based on a polarization direction. A specific polarization direction based on which the terminal device determines the L beam vectors may be predefined, for example, defined in a protocol, or may be indicated by the network device. This is not limited in this application.

K frequency domain basis vectors at any one of the R transmission layers may be the same as or different from K frequency domain basis vectors at another of the R transmission layers. If K frequency domain basis vectors at any one of the R transmission layers are the same as K frequency domain basis vectors at another of the R transmission layers, the terminal device may determine the K frequency domain basis vectors based on a transmission layer. If K frequency domain basis vectors at any one of the R transmission layers are different from K frequency domain basis vectors at another of the R transmission layers, the terminal device may determine corresponding K frequency domain basis vectors based on each transmission layer. It should be understood that a specific process in which the terminal device determines the K frequency domain basis vectors based on each transmission layer may be the same.

It should be understood that when L beam vectors at any one of the R transmission layers are the same as L beam vectors at another of the R transmission layers, and K frequency domain basis vectors at any one of the R transmission layers are the same as K frequency domain basis vectors at another of the R transmission layers, the terminal device may determine the L beam vectors and the K frequency domain basis vectors based on a transmission layer. A specific transmission layer based on which the terminal device determines the L beam vectors and the K frequency domain basis vectors may be predefined, for example, defined in a protocol, or may be indicated by the network device. This is not limited in this application.

For ease of description, the following uses an example in which the terminal device determines the L beam vectors and the K frequency domain basis vectors based on the $r^{th}$ transmission layer to describe a specific process. It may be understood that if L beam vectors at any one of the R transmission layers are different from L beam vectors at another of the R transmission layers, or K frequency domain basis vectors at any one of the R transmission layers are different from K frequency domain basis vectors at another of the R transmission layers, the terminal device may determine, in a same manner, L beam vectors or K frequency domain basis vectors corresponding to each transmission layer.

Specifically, the terminal device may arrange the ideal precoding vectors that are of the subbands at the $r^{th}$ transmission layer and that are determined in operation i from left to right in an order from 1 to $N_{sb}$, to obtain a $(P \times N_{tx}) \times N_{sb}$-dimensional matrix, for example, denoted as W. The matrix W is an example of the space-frequency matrix described above. The space-frequency matrix may be P component matrices corresponding to the P polarization directions. For example, a component matrix in a $p^{th}$ polarization direction in the matrix W may be denoted as $W_p$, and a dimension of $W_p$ is $N_{tx} \times N_{sb}$, where p is any integer from 1 to P.

The terminal device projects a component matrix in a polarization direction in space domain and frequency domain, to determine the L selected beam vectors in space domain and the K selected basis vectors in frequency domain. The component matrix may be a component matrix in the first polarization direction, or may be a component matrix in the $P^{th}$ polarization direction. This is not limited in this application. A polarization direction in which a component matrix is to be used may be indicated by the network device to the terminal device, or may be predefined, for example, defined in a protocol. This is not limited in this application.

For ease of description in the following, it is assumed that the terminal device projects the component matrix in the $p^{th}$ polarization direction to a matrix formed by a first vector set and a matrix formed by a second vector set, to determine the L beam vectors and the K basis vectors.

It is assumed that the first vector set includes $N_{tx}$ $N_{tx} \times 1$-dimensional column vectors, and an $N_{tx} \times N_{tx}$-dimensional matrix may be obtained by arranging the $N_{tx}$ column vectors from left to right, for example, denoted as $B_s$. It is assumed that the second vector set includes $N_{sb}$ $N_{sb} \times 1$-dimensional column vectors, and an $N_{sb} \times N_{sb}$-dimensional matrix may be obtained by arranging the $N_{sb}$ column vectors from left to right, for example, denoted as $B_f$.

The terminal device may project the component matrix $W_p$ in the $p^{th}$ polarization direction to $B_s$ and $B_f$ by left-multiplying $W_p$ by a conjugate transpose of $B_s$ and right-multiplying $W_p$ by $B_f$, that is, $B_s^H W_p B_f$. For example, a matrix obtained after projection is denoted as $Y_p$, and $Y_p = B_s^H W_p B_f$. A dimension of the matrix $Y_p$ may be $N_{tx} \times N_{sb}$. It may be understood that the matrix is a matrix corresponding to the $p^{th}$ polarization direction.

L strongest rows and K strongest columns are determined from the matrix $Y_p$. For example, the terminal device may separately perform modulo operations on $N_{tx}$ rows in the matrix $Y_p$, to select L rows with relatively large moduli, and may separately perform modulo operations on the $N_{sb}$ columns in the matrix $Y_p$, to select K columns with relatively large moduli. The terminal device determines the L selected column vectors from the first vector set according to sequence numbers of the L rows with relatively large moduli. Sequence numbers of columns in which the L column vectors are located are sequence numbers of the L rows, and the L column vectors may be the L selected beam vectors. The terminal device determines the K selected column vectors from the second vector set according to sequence numbers of the K columns with relatively large moduli. Sequence numbers of columns in which the K column vectors are located are sequence numbers of the K rows, and the K column vectors may be the K selected frequency domain basis vectors.

The terminal device may extract the L columns selected from the first vector set, and arrange the L columns from left to right, to obtain an $N_{tx} \times L$-dimensional matrix, for example, denoted as $U_{1,p}$. L columns in $U_{1,p}$ may be the L beam vectors. Because it is assumed that L beam vectors in any one of the P polarization directions are the same as L beam vectors in another of the P polarization directions, a $(P \times N_{tx}) \times L$-dimensional matrix $U_1$ may be formed by L beam vectors. For example, assuming that P=2, a structure of $U_1$ may be, for example, $$\begin{bmatrix} U_{1,1} & 0 \\ 0 & U_{1,2} \end{bmatrix}.$$

$U_{1,1} = U_{1,2}$, and $U_{1,1}$ and $U_{1,2}$ are both $N_{tx} \times L$-dimensional matrices formed by L beam vectors.

The terminal device may extract the K columns selected from the second vector set, and arrange the K columns from left to right, to obtain an $N_{sb} \times K$-dimensional matrix, for example, denoted as $U_2$. K columns in $U_2$ may be the K frequency domain basis vectors.

Each of 1 to P is selected, in a traversing manner, as a value of p, and the following operation is repeated, to obtain L×K coefficients in each of the P polarization directions, that is, P×L×K coefficients: A conjugate transpose of a matrix $U_{1,p}$ and the matrix $U_2$ are projected to the space-frequency matrix $W_p$ in the $p^{th}$ polarization direction. For example, L×K coefficients may be obtained by left-multiplying $W_p$ by $U_{1,p}^H$ and right-multiplying $W_p$ by $U_2$. The L×K coefficients are coefficients in the $p^{th}$ polarization direction.

By repeating the foregoing operation, P×L×K coefficients in the P polarization directions may be obtained, and the P×L×K coefficients may form a (P×L)×K-dimensional matrix, for example, denoted as X.

In this way, a space-frequency matrix $W = U_1 X U_2^H$ can be obtained. $U_1$ is determined by the L beam vectors, $U_2$ is determined by the K frequency domain basis vectors, and X is determined by the P×L×K weighting coefficients. Therefore, $U_1$ may be a $(P \times N_{tx}) \times L$-dimensional matrix, X may be a (P×L)×K-dimensional coefficient matrix, and $U_2$ may be an $N_{sb} \times K$-dimensional matrix.

It may be understood that the space-frequency matrix and the space-frequency matrix $W = W_1 H V_2^H$ the implementation 1 may be equivalent, or may be mutually converted.

In the space-frequency matrix, each coefficient in the coefficient matrix X includes an amplitude coefficient and a phase coefficient. Wideband amplitude coefficients of the L beam vectors in each polarization direction may be further determined based on the amplitude coefficients, or wideband amplitude coefficients of the L beam vectors in each polarization direction and amplitude coefficients of the K frequency domain basis vectors in each polarization direction may be further determined based on the amplitude coefficients.

In an implementation, the terminal device may extract a coefficient with a largest modulus from each of P×L rows in the (P×L)×K-dimensional matrix, to obtain P×L coefficients. The terminal device may use amplitude coefficients in the P×L coefficients as wideband amplitude coefficients of the L beam vectors in the P polarization directions. In this way, P×L intermediate vectors may be obtained, and a dimension of each intermediate vector is $N_{tx} \times 1$. A $(P \times N_{tx}) \times (P \times L)$-dimensional matrix may be formed by the P×L intermediate vectors, and elements in a $((p-1) \times L+1)^{th}$ column to a $(p \times L)^{th}$ column and a $p^{th}$ row to a $(p \times N_{tx})^{th}$ row in the matrix may be determined by L intermediate vectors in the $p^{th}$ polarization direction, or may be obtained by separately multiplying the L beam vectors by the L wideband amplitude coefficients in the $p^{th}$ polarization direction. The matrix is $W_1$ in the space-frequency matrix.

Then, the terminal device may calculate a relative value of each coefficient in each row. A relative value of each coefficient in an $l^{th}$ row may be represented by a ratio of a modulus of each coefficient in the $l^{th}$ row to a modulus of a wideband amplitude coefficient extracted from the $l^{th}$ row. A relative value of each coefficient is a weighting coefficient, and a (P×L)×K-dimensional matrix formed by the weighting coefficients is a coefficient matrix, that is, the coefficient matrix H in the space-frequency matrix. The K frequency domain basis vectors are K frequency domain column vectors, that is, $U_2 = V_2$.

In another implementation, the terminal device may extract a coefficient with a largest modulus from each of P×L rows in the (P×L)×K-dimensional matrix, to obtain P×L coefficients. Amplitude coefficients in the P×L coefficients may be used as wideband amplitude coefficients of the L beam vectors in the P polarization directions. In this way, P×L space domain column vectors may be obtained, and W in the space-frequency matrix may be obtained.

The terminal device may further extract a coefficient with a largest modulus from each of K columns, to obtain K coefficients. Amplitude coefficients of the K coefficients may be used as amplitude coefficients of the K frequency domain basis vectors. In this way, the K frequency domain column vectors, that is, $V_2$ in the space-frequency matrix may be obtained.

Then, the terminal device may determine the coefficient matrix H in the space-frequency matrix. A dimension of the coefficient matrix H is (P×L)×K, and an element $h_{i,j}$ in the coefficient matrix H may be obtained by dividing an element in the foregoing (P×L)×K-dimensional matrix by a largest modulus of an $i^{th}$ row and a largest modulus of a $j^{th}$ column, or may be directly determined based on a phase coefficient in the original matrix X.

Step (iii):

The terminal device determines the PMI.

The terminal device may determine the PMI based on the foregoing determined space-frequency matrix, or may determine the PMI based on the P×L space domain column vectors, the K frequency domain column vectors, and the (P×L)×K weighting coefficient corresponding to the $r^{th}$ transmission layer that are determined in operation ii. This is not limited in this application.

Specific content of the PMI has been described in detail in operation (vi) in the implementation 1. For brevity, details are not described herein again.

It should be understood that the foregoing lists two possible implementations of determining the PMI by the terminal device with reference to the implementation 1 and the implementation 2. However, this should not constitute any limitation on this application. A specific implementation of determining the PMI is not limited in this application.

In operation 350, the terminal device sends the PMI. Correspondingly, the network device receives the PMI.

Specifically, the PMI may be carried in CSI. The terminal device may send the CSI to the network device by using, for example, a physical uplink control channel (physical uplink control channel, PUCCH) or a physical uplink shared channel (physical uplink shared channel, PUSCH), so that the network device restores the precoding matrix based on the PMI in the CSI.

In operation 360, the network device determines, based on the PMI, the precoding matrix corresponding to each subband.

After receiving the PMI, the network device may determine, based on the R pieces of space-frequency information corresponding to the R transmission layers, the precoding matrix corresponding to each subband, or may determine space-frequency matrices based on the R pieces of space-frequency information, and then determine the precoding matrix corresponding to each subband.

The following describes in detail a specific process in which the network device determines the precoding matrix of each subband.

In one embodiment, the space domain vector is a $(P \times N_{tx}) \times 1$-dimensional column vector, the frequency domain vector is an $N_{sb} \times 1$-dimensional column vector, and the quantity of polarization directions is 1. Step 360 specifically includes:

selecting, in a traversing manner, each of 1 to $N_{sb}$ as a value of $n_{sb}$, and repeatedly performing the following operations, to obtain the precoding matrix of each subband:

selecting, in a traversing manner, each of 1 to R as a value of r, and repeatedly performing the following operation to determine a precoding matrix of an $n_{sb}^{th}$ subband: determining a precoding vector $w_{r,n_{sb}}$ of the $n_{sb}^{th}$ subband at the $r^{th}$ transmission layer based on the P×L space domain vectors, the K frequency domain vectors, and the P×L×K coefficients that are indicated by the $r^{th}$ group of space-frequency information in the R groups of space-frequency information:

$$w_{r,n_{sb}} = \sum_{l=1}^{L} v_l a_{r,l}^{(1)} \left( \sum_{k=1}^{K} a_{r,k,l}^{(2)} \varphi_{r,l,k} \overline{u}_{r,k,n_{sb}} \right). \quad \text{Formula 1}$$

$w_{r,n_{sb}}$ may correspond to the $n_{sb}^{th}$ subband, and may be used to determine the precoding vector of the $n_{sb}^{th}$ subband at the $r^{th}$ transmission layer. $v_l$ represents an $l^{th}$ beam vector in the L beam vectors corresponding to the $r^{th}$ transmission layer, $d_{r,l}^{(1)}$ represents a quantized value of an amplitude coefficient of $v_l$, $u_{r,k,n_{sb}}$ represents an $n_{sb}^{th}$ element in a $k^{th}$ frequency domain vector in the K frequency domain vectors corresponding to the $r^{th}$ transmission layer, $\overline{u}_{r,k,n_{sb}}$ represents a conjugate of $u_{r,k,n_{sb}}$, $a_{r,l,k}^{(2)}$ represents a quantized value of an amplitude of a linear superposition coefficient corresponding to an $l^{th}$ space domain vector in the P×L space domain vectors and the $k^{th}$ frequency domain vector in the K frequency domain vectors, and $\varphi_{r,l,k}$ represents a quantized value of a phase of the linear superposition coefficient corresponding to the $l^{th}$ space domain vector in the P×L space domain vectors and the $k^{th}$ frequency domain vector in the K frequency domain vectors.

That is, precoding vectors corresponding to the $n_{sb}^{th}$ subband at the R transmission layers are separately determined, to determine the precoding matrix corresponding to the $n_{sb}^{th}$ subband, and determine precoding matrices of the $N_{sb}$ subbands.

In one embodiment, the space domain vector is a $(P \times N_{tx}) \times 1$-dimensional column vector, the frequency domain vector is an $N_{sb} \times 1$-dimensional column vector, and the quantity of polarization directions is 2. Step 360 specifically includes:

selecting, in a traversing manner, each of 1 to $N_{sb}$ as a value of $n_{sb}$, and repeatedly performing the following operations, to obtain the precoding matrix corresponding to each subband:

selecting, in a traversing manner, each of 1 to R as a value of r, and repeatedly performing the following operation to determine a precoding matrix of an $n_{sb}^{th}$ subband: determining a precoding vector $w_{r,n_{sb}}$ of the $n_{sb}^{th}$ subband at the $r^{th}$ transmission layer based on the P×L space domain vectors, the K frequency domain vectors, and the P×L×K coefficients that are indicated by the $r^{th}$ group of space-frequency information in the R groups of space-frequency information:

$$w_{r,n_{sb}} = \begin{bmatrix} \sum_{l=1}^{L} v_l a_{r,l}^{(1)} \left( \sum_{k=1}^{K} a_{r,l,k}^{(2)} \varphi_{r,l,k} \overline{u}_{r,k,n_{sb}} \right) \\ \sum_{l=1}^{L} v_l a_{r,l+L}^{(1)} \left( \sum_{k=1}^{K} a_{r,l+L,k}^{(2)} \varphi_{r,l+L,k} \overline{u}_{r,k,n_{sb}} \right) \end{bmatrix}. \quad \text{Formula 2}$$

$w_{r,n_{sb}}$ may correspond to the $n_{sb}^{th}$ subband, and may be used to determine the precoding vector of the $n_{sb}^{th}$ subband at the $r^{th}$ transmission layer. $v_l$ represents an $l^{th}$ column vector in the L column vectors corresponding to the $r^{th}$ transmission layer, $a_{r,l}^{(1)}$ represents a quantized value of an amplitude coefficient of $v_l$ in a first polarization direction, $a_{r,l+L}^{(1)}$ represents a quantized value of an amplitude coefficient of $v_l$ in a second polarization direction, $u_{r,k,j}$ represents an $n_{sb}^{th}$ element in a $k^{th}$ column vector in the K column vectors corresponding to the $r^{th}$ transmission layer, and $\overline{u}_{r,k,n_{sb}}$ represents a conjugate of $u_{r,k,n_{sb}}$. $a_{r,l,k}^{(2)}$ represents a quantized value of an amplitude of a linear superposition coefficient corresponding to the $l^{th}$ space domain vector in the L space domain vectors and the $k^{th}$ frequency domain vector in the K frequency domain vectors in the first polarization direction, that is, a quantized value of an amplitude of a linear superposition coefficient of a vector operation result of $v_l$ and $u_{r,k}$ in the first polarization direction. $a_{r,l+L,k}^{(2)}$ represents a quantized value of an amplitude of a linear superposition coefficient corresponding to the $l^{th}$ space domain vector in the L space domain vectors and the $k^{th}$ frequency domain vector in the K frequency domain vectors in the second polarization direction, that is, a quantized value of an amplitude of a linear superposition coefficient of a vector operation result of $v_l$ and $u_{r,k}$ in the second polarization direction. $\varphi_{r,l,k}$ represents a quantized value of a phase of the linear superposition coefficient corresponding to the $l^{th}$ space domain vector in the L space domain vectors and the $k^{th}$ frequency domain vector in the K frequency domain vectors in the first polarization direction, that is, a quantized value of a phase coefficient of a vector operation result of $v_l$ and $u_{r,k}$. $\varphi_{r,l+L,k}$ represents a quantized value of a phase of a linear superposition coefficient corresponding to the $l^{th}$ space domain vector in the L space domain vectors and the $k^{th}$ frequency domain vector in the K frequency domain vectors in the second polarization direction, that is, a quantized value of a phase of a linear superposition coefficient of a vector operation result of $v_l$ and $u_{r,k}$.

That is, precoding vectors corresponding to the $n_{sb}^{th}$ subband at the R transmission layers are separately determined, to determine the precoding matrix corresponding to the $n_{sb}^{th}$ subband, and determine precoding matrices of the $N_{sb}$ subbands.

It may be understood that the foregoing listed formulas are defined based on a case in which both the space domain vector and the frequency domain vector are column vectors. If the space domain vector is a column vector, and the frequency domain vector is a row vector, when the quantity of polarization directions is 1, $$w_{r,n_{sb}} = \sum_{l=1}^{L} v_l a_{r,l}^{(1)} \left( \sum_{k=1}^{K} a_{r,l,k}^{(2)} \varphi_{r,l,k} u_{r,k,n_{sb}} \right), \quad \text{Formula 3}$$

when the quantity of polarization directions is 2, $$w_{r,n_{sb}} = \begin{bmatrix} \sum_{l=1}^{L} v_l a_{r,l}^{(1)} \left( \sum_{k=1}^{K} a_{r,l,k}^{(2)} \varphi_{r,l,k} \overline{u}_{r,k,n_{sb}} \right) \\ \sum_{l=1}^{L} v_l a_{r,l+L}^{(1)} \left( \sum_{k=1}^{K} a_{r,l+L,k}^{(2)} \varphi_{r,l+L,k} \overline{u}_{r,k,n_{sb}} \right) \end{bmatrix}. \quad \text{Formula 4}$$

The parameters have been described in detail above. For brevity, details are not described herein again.

In one embodiment, in operation 360, the network device may alternatively determine the R space-frequency matrices based on the PMI, and further determine, based on the R space-frequency matrices, the precoding matrices corresponding to the $N_{sb}$ subbands.

The network device may restore, based on the PMI, the R space-frequency matrices corresponding to the R transmission layers. As described above, the space-frequency matrix may be a $(P \times N_{tx}) \times N_{sb}$-dimensional matrix, or may be a $(P \times N_{tx} \times N_{sb}) \times 1$-dimensional column vector. The network device may separately restore the R space-frequency matrices based on different forms. Then, the network device may also restore, according to the formulas listed above, a column vector $w_{r,n_{sb}}$ corresponding to the $r^{th}$ transmission layer and the $n_{sb}^{th}$ subband. The column vector $w_{r,n_{sb}}$ may correspond to an $n_{sb}^{th}$ column vector in the $(P \times N_{tx}) \times N_{sb}$-dimensional matrix or may correspond to a column vector formed by a $((P \times N_{tx}) \times (n_{sb}-1)+1)^{th}$ element to a $((P \times N_{tx}) \times n_{sb})^{th}$ element in the $(P \times N_{tx} \times N_{sb}) \times 1$-dimensional column vector. The precoding matrix of the $n_{sb}^{th}$ subband may be determined based on an $n_{sb}^{th}$ column vector at the R transmission layers.

It should be understood that when both the space domain vector and the frequency domain vector are row vectors, or when the space domain vector is a row vector and the frequency domain vector is a column vector, an expression of $w_{r,n_{sb}}$ may be obtained by performing mathematical transformation according to the foregoing formulas.

It should be noted that when both the space domain vector and the frequency domain vector are column vectors, both the first vector set and the second vector set may be column vector sets. However, it should be understood that the first vector set and the second vector set are not limited to the forms listed in the foregoing embodiment. For example, vectors in the second vector set may also undergo mathematical transformation, for example, conjugates of the vectors in the second vector set are taken to form a new second vector set. In this case, the network device may still determine the precoding matrix according to the foregoing formula 3 or formula 4.

When the space domain vector is a column vector, and the frequency domain vector is a row vector, the first vector set may be a column vector set, and the second vector set may be a row vector set. For example, the row vectors in the second vector set may be obtained by performing mathematical transformation on the column vectors in the second vector set listed in the foregoing embodiment. For example, transposes or conjugate transposes of the vectors are taken to form a new second vector set. This is not limited in this application. When the transposes of the column vectors in the second vector set are taken to form a new second vector set, the network device may still determine the precoding matrix according to the foregoing formula 1 or formula 2. When the conjugate transposes of the column vectors in the second vector set are taken to form a new second vector set, the network device may still determine the precoding matrix according to the foregoing formula 3 or formula 4.

If the space-frequency matrix is the $(P \times N_{tx} \times N_{sb}) \times 1$-dimensional column vector, the space-frequency matrix may be obtained by linearly superimposing the foregoing $P \times L \times K$ component matrices. The component matrix may be obtained by using a Kronecker product of a conjugate vector of one of the K frequency domain column vectors and one of the P×L space domain column vectors. In this case, the network device may still restore, according to the foregoing formulas, the column vector $w_{r,n_{sb}}$ that corresponds to the $n_{sb}^{th}$ subband and that is in the space-frequency matrix of the $r^{th}$ transmission layer. It may be understood that the column vector $w_{r,n_{sb}}$ may be a column vector formed by an $((n_{sb}-1) \times (P \times N_{tx})+1)^{th}$ element to an $(n_{sb} \times (P \times N_{tx}))^{th}$ element in the $(P \times N_{tx} \times N_{sb}) \times 1$-dimensional column vector.

Then, the network device determines, based on the R space-frequency matrices corresponding to the R transmission layers, a precoding matrix corresponding to an $N_{sb}^{th}$ subband.

According to the methods listed above, the network device may obtain the R space-frequency matrices corresponding to the R transmission layers. Each space-frequency matrix includes one column vector corresponding to the $N_{sb}$ subbands. The network device may extract a column vector corresponding to the $n_{sb}^{th}$ subband from each space-frequency matrix, to obtain R column vectors corresponding to the $n_{sb}^{th}$ subband. A dimension of each column vector may be $(P \times N_{tx}) \times 1$. A $(P \times N_{tx}) \times R$-dimensional matrix may be formed by the R column vectors, and the matrix is the precoding matrix corresponding to the $n_{sb}^{th}$ subband.

As described above, the space-frequency matrix may be a $(P \times N_{tx}) \times N_{sb}$-dimensional matrix, or may be a $(P \times N_{tx} \times N_{sb}) \times 1$-dimensional column vector. The network device may determine, based on different forms, a column vector corresponding to each subband at each transmission layer, and further determine the precoding matrix corresponding to each subband.

If the space-frequency matrix is the $(P \times N_{tx}) \times N_{sb}$-dimensional matrix, $N_{sb}$ column vectors in the matrix one-to-one correspond to the $N_{sb}$ subbands. The network device may extract an $n_{sb}^{th}$ column in each of the R space-frequency matrices, to obtain R $(P \times N_{tx}) \times 1$-dimensional column vectors, and arrange the R column vectors from left to right in an order from the first transmission layer to the $R^{th}$ transmission layer. A $(P \times N_{tx}) \times R$-dimensional matrix may be obtained through normalization, and the matrix is the precoding matrix corresponding to the $n_{sb}^{th}$ subband. The normalization may be: multiplying each element in each of R column vectors by a normalization coefficient of each column, so that a sum of powers of all elements is equal to 1, and multiplying the R column vectors by an overall normalization coefficient, so that a sum of powers of all column vectors is equal to 1. A specific normalization method is not limited in this application.

If the space-frequency matrix is the $(P \times N_{tx} \times N_{sb}) \times 1$-dimensional column vector, every $P \times N_{tx}$ continuous elements in the column vector correspond to one subband. The network device may use every $P \times N_{tx}$ continuous elements as one column in an arrangement order of the $N_{tx} \times N_{sb}$ elements, extract $N_{sb}$ columns, and arrange the $N_{sb}$ columns from left to right in an order from the first transmission layer to the $R^{th}$ transmission layer, to obtain a $(P \times N_{tx}) \times N_{sb}$-dimensional matrix. $N_{sb}$ column vectors in the matrix one-to-one correspond to $N_{sb}$ subbands. Then, the network device may restore, by using the method described above, the precoding matrix corresponding to the $n_{sb}^{th}$ subband.

Each of 1 to $N_{sb}$ is selected, in a traversing manner, as a value of $n_{sb}$, and the foregoing operations are repeated, so that the network device can restore the precoding matrices corresponding to the $N_{sb}$ subbands.

It should be understood that the method for restoring the precoding matrix by the network device listed above is merely a possible implementation, and should not constitute any limitation on this application. For example, the space-frequency matrix is used as an intermediate value during restoring of the precoding matrix, and may not be generated. A specific implementation of restoring the precoding matrix by the network device based on the PMI is not limited in this application.

According to the foregoing method, the terminal device may represent column vectors in the ideal precoding matrices of subbands in frequency domain by using linear combinations of beam vectors in space domain, and describe, by using linear combinations of several frequency domain vectors, weighting coefficients used in the linear combinations of the beam vectors. Each frequency domain basis vector may be used to represent a change rule on a plurality of subbands. Therefore, change rules of the combination coefficients of the space domain column vectors of the subbands may be described by performing different linear combinations on several frequency domain basis vectors. Because different change rules in frequency domain are described by using a plurality of frequency domain basis vectors, a relationship between the subbands is fully used, and change rules on all subbands may be described by using a relatively small quantity of frequency domain basis vectors according to frequency domain continuity, to compress feedback overheads. Compared with a conventional technology manner of per-subband feedbacks, feedback overheads caused by subband feedbacks can be greatly reduced, and approximation precision by using the type II codebook can also be ensured.

It should be understood that the foregoing descriptions are merely for ease of understanding, and the embodiments of this application are described in detail by using an example in which a beam vector and a frequency domain basis vector are in a form of a column vector. However, this should not constitute any limitation on this application. The beam vector and the frequency domain basis vector may be row vectors in this application. Based on a same concept, a person skilled in the art may still feed back the PMI and determine the precoding matrix in the foregoing feedback manner through mathematical transformation or equivalent replacement.

In this case, the first vector set may include at least one of the following: an $N_{tx}$-dimensional 2D-DFT vector, a transpose of the $N_{tx}$-dimensional 2D-DFT vector, a conjugate of the $N_{tx}$-dimensional 2D-DFT vector, a conjugate transpose of the $N_{tx}$-dimensional 2D-DFT vector, an oversampled $N_{tx}$-dimensional 2D-DFT vector, a transpose of the oversampled $N_{tx}$-dimensional 2D-DFT vector, a conjugate of the oversampled $N_{tx}$-dimensional 2D-DFT vector, and a conjugate transpose of the oversampled $N_{tx}$-dimensional 2D-DFT vector. The first vector may further include a truncation of the 2D-DFT vector, a truncation of the transpose of the 2D-DFT vector, a truncation of the conjugate of the 2D-DFT vector, a truncation of the conjugate transpose of the 2D-DFT vector, a truncation of the oversampled 2D-DFT vector, a truncation of the transpose of the oversampled 2D-DFT vector, a truncation of the conjugate of the oversampled $N_{tx}$-dimensional 2D-DFT vector, and a truncation of the conjugate transpose of the oversampled 2D-DFT vector. In addition, a dimension of a truncation may be $N_{tx}$.

The second vector set may include at least one of the following: an $N_{sb}$-dimensional DFT vector, a transpose of the $N_{sb}$-dimensional DFT vector, a conjugate of the $N_{sb}$-dimensional DFT vector, a conjugate transpose of the $N_{sb}$-dimensional DFT vector, an oversampled $N_{sb}$-dimensional DFT vector, a transpose of the oversampled $N_{sb}$-dimensional DFT vector, a conjugate of the oversampled $N_{sb}$-dimensional DFT vector, and a conjugate transpose of the oversampled $N_{sb}$-dimensional DFT vector. The second vector set may further include at least one of a truncation of the DFT vector, a truncation of the transpose of the DFT vector, a truncation of the conjugate of the DFT vector, a truncation of the conjugate transpose of the DFT vector, a truncation of the oversampled DFT vector, a truncation of the transpose of the oversampled DFT vector, a truncation of the conjugate of the oversampled DFT vector, and a truncation of the conjugate transpose of the oversampled DFT vector. In addition, a dimension of a truncation may be $N_{sb}$.

Therefore, the first vector set may provide a plurality of $N_{tx}$-dimensional beam vectors, and the second vector set may provide a plurality of $N_{sb}$-dimensional frequency domain basis vectors.

It should be noted that the precoding matrix indication method provided above is particularly applicable to a case in which there are a large quantity of subbands and the subbands are continuous. In this method, a correlation between the subbands can be fully used, and feedback overheads can be compressed, thereby reducing huge overheads caused by a plurality of subband feedbacks. However, in some cases, there are a relatively small quantity of subbands, or subbands are discontinuous. If an existing manner of a PMI is fed back by using both a wideband feedback and a subband feedback, high feedback overheads may not be caused. In addition, when the subbands are discontinuous, relatively high approximation precision can be ensured in a manner of per-subband feedbacks. Therefore, this application provides another precoding matrix indication method, so that the PMI can be fed back in feedback modes in different scenarios, thereby ensuring approximation precision and reducing feedback overheads.

Figure 5:
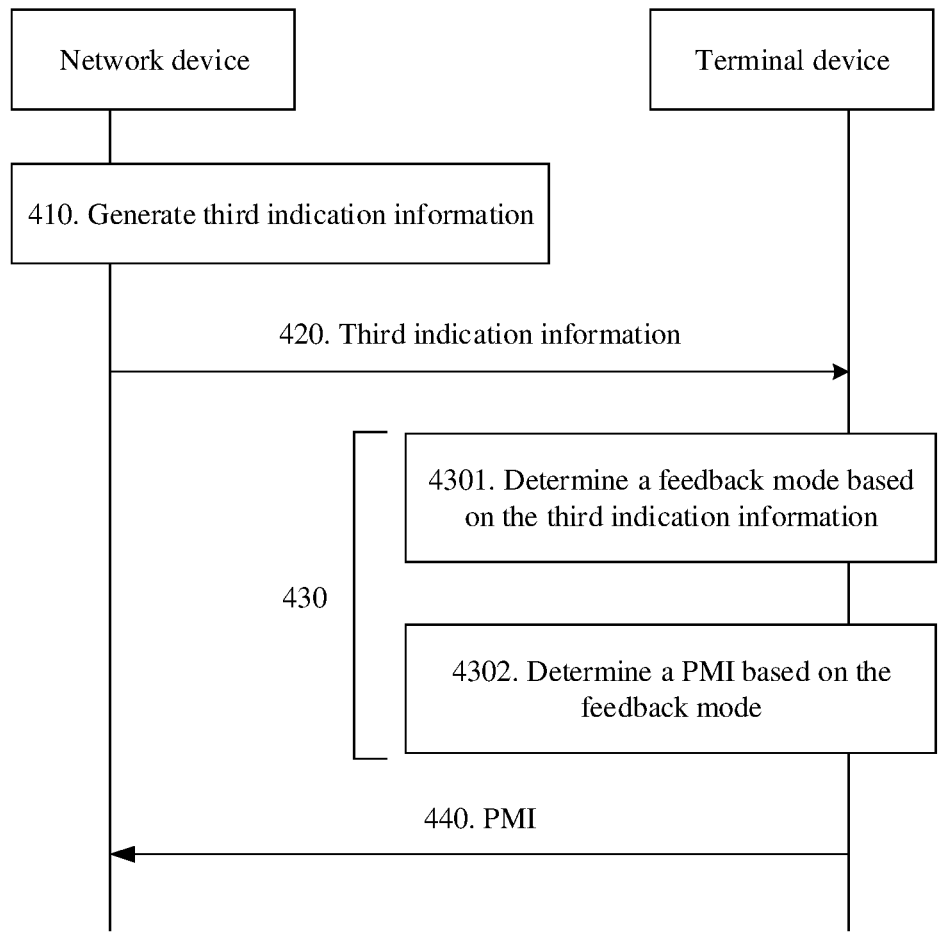
FIG. 5 is a schematic flowchart of a precoding matrix indication method according to another embodiment of this application.

The following describes in detail a precoding matrix method provided in another embodiment of this application with reference to FIG. 5.

FIG. 5 is a schematic flowchart of a precoding matrix indication method according to another embodiment of this application from a perspective of device interaction. As shown in FIG. 5, the method 400 may include operation 410 to operation 440. The following describes each operation in the method 400 in detail.

In operation 410, a network device generates third indication information, where the third indication information is used to determine a feedback mode for feeding back a PMI based on a type II codebook.

In this embodiment, there may be at least two feedback modes for feeding back the PMI based on the type II codebook, and the feedback mode determined by the terminal device based on the third indication information may be a first feedback mode or a second feedback mode. The first feedback mode is a mode for feeding back the PMI based on a first vector set, and the second feedback mode is a mode for feeding back the PMI based on the first vector set and a second vector set.

The first vector set may include at least one of the following: an $N_{tx}$-dimensional 2D-DFT vector, a transpose of the $N_{tx}$-dimensional 2D-DFT vector, a conjugate of the $N_{tx}$-dimensional 2D-DFT vector, a conjugate transpose of the $N_{tx}$-dimensional 2D-DFT vector, an oversampled $N_{tx}$-dimensional 2D-DFT vector, a transpose of the oversampled $N_{tx}$-dimensional 2D-DFT vector, a conjugate of the oversampled $N_{tx}$-dimensional 2D-DFT vector, and a conjugate transpose of the oversampled $N_{tx}$-dimensional 2D-DFT vector. The first vector may further include a truncation of the 2D-DFT vector, a truncation of the transpose of the 2D-DFT vector, a truncation of the conjugate of the 2D-DFT vector, a truncation of the conjugate transpose of the 2D-DFT vector, a truncation of the oversampled 2D-DFT vector, a truncation of the transpose of the oversampled 2D-DFT vector, a truncation of the conjugate of the oversampled $N_{tx}$-dimensional 2D-DFT vector, and a truncation of the conjugate transpose of the oversampled 2D-DFT vector. In addition, a dimension of a truncation may be $N_{tx}$.

The second vector set may include at least one of the following: an $N_{sb}$-dimensional DFT vector, a transpose of the $N_{sb}$-dimensional DFT vector, a conjugate of the $N_{sb}$-dimensional DFT vector, a conjugate transpose of the $N_{sb}$-dimensional DFT vector, an oversampled $N_{sb}$-dimensional DFT vector, a transpose of the oversampled $N_{sb}$-dimensional DFT vector, a conjugate of the oversampled $N_{sb}$-dimensional DFT vector, and a conjugate transpose of the oversampled $N_{sb}$-dimensional DFT vector. The second vector set may further include at least one of a truncation of the DFT vector, a truncation of the transpose of the DFT vector, a truncation of the conjugate of the DFT vector, a truncation of the conjugate transpose of the DFT vector, a truncation of the oversampled DFT vector, a truncation of the transpose of the oversampled DFT vector, a truncation of the conjugate of the oversampled DFT vector, and a truncation of the conjugate transpose of the oversampled DFT vector. In addition, a dimension of a truncation may be $N_{sb}$.

In this embodiment, the first vector set may provide a plurality of space domain beam vectors, and the second vector set may provide a plurality of frequency domain basis vectors. In a possible implementation, the first feedback mode may be, for example, a feedback mode of the type II codebook defined in the NR protocol TS38.214 release 15 (R15), and may be specifically a feedback mode combining a wideband feedback and a per-subband feedback. The second feedback mode may be, for example, a feedback mode described above with reference to the method 300. Compared with the first feedback mode, the second feedback mode may be understood as a feedback mode combining a wideband feedback and a joint subband feedback. It can be learned from the foregoing description that in the second feedback mode, feedback is jointly performed on a plurality of subbands according to frequency domain continuity by using a relationship between the subbands. Compared with the first feedback mode, feedback overheads are greatly reduced.

In this embodiment, the third indication information may be used to indicate any one of the following information:
(a) a PMI feedback mode, or
(b) a quantity and positions of to-be-reported subbands, or
(c) a quantity K of frequency domain column vectors.

When the third indication information is used to indicate (a), the network device directly indicates the PMI feedback mode by using the third indication information.

When the third indication information is used to indicate (b), the third indication information may reuse existing signaling. In a channel measurement process, the network device may indicate the quantity of to-be-reported subbands and positions of the to-be-reported subbands in a band to the terminal device by using parameter configuration information. At least the quantity or the positions of to-be-reported subbands may be used to determine the PMI feedback mode.

When the third indication information is used to indicate (c), the third indication information may be the same information as the first indication information described above. The quantity of frequency domain column vectors may be equal to a quantity of frequency domain basis vectors. If the quantity K of frequency domain basis vectors is 0, it may implicitly indicate that the first feedback mode is used. If the quantity K of frequency domain column vectors is greater than 0, it may implicitly indicate that the second feedback mode is used.

In operation 420, the network device sends the third indication information. Correspondingly, the terminal device receives the third indication information.

As an example instead of a limitation, the third indication information may be carried in an RRC message, a MAC CE, or DCI. The terminal device may determine the PMI feedback mode based on the third indication information.

In operation 430, the terminal device determines the feedback mode based on the third indication information, and determines the PMI based on the feedback mode.

In one embodiment, step 430 specifically includes:
Operation 4301: The terminal device may determine the feedback mode based on the third indication information.
Step 4302: The terminal device determines the PMI based on the feedback mode.

The following describes operation 4301 in detail.

If the third indication information received by the terminal is (a) described above, the terminal device may determine the PMI based on the feedback mode indicated by the third indication information.

If the third indication information received by the terminal device is (b) described above, the terminal device may determine the PMI feedback mode according to a preset rule based on at least the quantity or the positions of the subbands indicated by the third indication information. In this case, the network device may alternatively determine the PMI feedback mode according to a same preset rule, to restore a precoding matrix based on the determined feedback mode and the PMI subsequently fed back by the terminal device.

In an implementation, for example, the to-be-reported subbands may be indicated by using a bitmap. For example, if the quantity of subbands is 10, 10 bits may one-to-one correspond to the 10 subbands. A bit corresponding to a to-be-reported subband may be set to "1", and a bit corresponding to a subband that is not to be reported may be set to "0". Alternatively, a bit corresponding to a to-be-reported subband may be set to "0", and a bit corresponding to a subband that is not to be reported may be set to "1". This is not limited in this application.

It should be understood that indicating the to-be-reported subbands by using the bitmap is merely a possible implementation, and should not constitute any limitation on this application. A specific manner of indicating the to-be-reported subbands by the network device is not limited in this application. For example, the network device may directly indicate sequence numbers of the to-be-reported subbands to the terminal device.

In one embodiment, the preset rule is that the first feedback mode is used when the quantity of to-be-reported subbands is less than a preset first threshold, and the second feedback mode is used when the quantity of to-be-reported subbands is greater than or equal to the first threshold.

To be specific, when there are a relatively small quantity of to-be-reported subbands, per-subband feedbacks cause relatively low feedback overheads, and the first feedback mode may be used. When there are a relatively large quantity of to-be-reported subbands, per-subband feedbacks cause relatively high feedback overheads, and the second feedback mode may be used.

The first threshold may be preconfigured by the network device for the terminal device, or may be predefined, for example, defined in a protocol, or may be determined by the terminal device and reported to the network device. This is not limited in this application.

In one embodiment, the preset rule is that the second feedback mode is used when the quantity of to-be-reported subbands is greater than or equal to a predefined threshold, and the first feedback mode is used when the quantity of to-be-reported subbands is less than the predefined threshold.

When there are a relatively large quantity of to-be-reported subbands, per-subband feedbacks may cause relatively high feedback overheads. Therefore, the second feedback mode may be used to reduce feedback overheads.

For example, the predefined threshold may be defined in a protocol, may be fixed, or may vary with a total quantity of subbands. The protocol may define thresholds corresponding to different quantities of subbands. For example, the quantity of subbands is 10, and the threshold is 5. To be specific, there are 10 subbands in total. When the quantity of to-be-reported subbands is greater than or equal to 5, the second feedback mode is used, and when the quantity of to-be-reported subbands is less than 5, the first feedback mode is used. For another example, the quantity of subbands is 20, and the threshold is 10. To be specific, there are 20 subbands in total. When the quantity of to-be-reported subbands is greater than or equal to 10, the second feedback mode is used, and when the quantity of to-be-reported subbands is less than 10, the first feedback mode is used.

In one embodiment, the preset rule is that the first feedback mode is used when to-be-reported subbands are discontinuous, and the second feedback mode is used when the to-be-reported subbands are continuous.

To be specific, when the to-be-reported subbands are discontinuous in frequency domain, approximation precision of a precoding matrix restored by using a PMI fed back in the second feedback mode may be lower than that in the first feedback mode. Therefore, the first feedback mode may be preferably used. When the to-be-reported subbands are continuous in frequency domain, approximation precision of a precoding matrix restored by using a PMI fed back in the second feedback mode may be basically the same as that in the first feedback mode. Therefore, the second feedback mode with relatively low feedback overheads may be used.

When the to-be-reported subbands are indicated by using a bitmap, "1" is used to indicate a to-be-reported subband, and "0" is used to indicate a subband that is not to be reported, if a plurality of continuous bits in the bitmap are "1", and there is no "0" between any two continuous "1", it is considered that the to-be-reported subbands are continuous. If there is "0" between two adjacent "1" in the bitmap, it is considered that the to-be-reported subbands are discontinuous.

In one embodiment, the preset rule is that the second feedback mode is used when the to-be-reported subbands are discontinuous but are regularly arranged in frequency domain, and the first feedback mode is used when the to-be-reported subbands are discontinuous and are irregularly arranged in frequency domain.

For example, if the to-be-reported subbands are discontinuous but are regularly arranged in frequency domain, for example, there is one or more subbands between two adjacent to-be-reported subbands, for another example, if sequence numbers of the to-be-reported subbands are all odd numbers or are all even numbers, the second feedback mode may be used. Otherwise, the first feedback mode may be used.

Whether the to-be-reported subbands are continuous may be determined in the following manner.

In one embodiment, the preset rule is that the second feedback mode is used when the quantity of to-be-reported subbands is greater than or equal to the first threshold and the to-be-reported subbands are continuous. Otherwise, the first feedback mode is used.

To be specific, when there are a relatively large quantity of to-be-reported subbands and the to-be-reported subbands are continuous in frequency domain, the second feedback mode with relatively low feedback overheads may be preferably used. When there are a relatively small quantity of to-be-reported subbands, because feedback overheads caused by per-subband feedback are not large, the first feedback mode may be used. When the to-be-reported subbands are discontinuous in frequency domain, approximation precision of a precoding matrix restored by using a PMI fed back in the second feedback mode may be lower than that in the first feedback mode. Therefore, the first feedback mode may be used.

Figure 6:
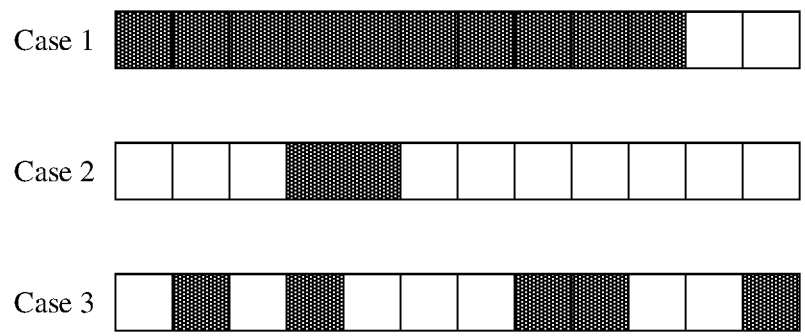
FIG. 6 shows several possible distribution cases of to-be-reported subbands in frequency domain.

FIG. 6 shows several possible distribution cases of the to-be-reported subbands in frequency domain. As shown in the figure, each grid may represent one subband, and a subband with a shadow represents a to-be-reported subband. In a case 1, a plurality of to-be-reported subbands are continuously distributed in frequency domain, and there are a relatively large quantity of to-be-reported subbands. Therefore, the PMI may be fed back in the second feedback mode. In a case 2, there are a very small quantity of to-be-reported subbands, and per-subband feedbacks do not cause high feedback overheads. Therefore, the first feedback mode may be used. In a case 3, to-be-reported subbands are discontinuous in frequency domain and are irregular. Therefore, the PMI may be fed back in the first feedback mode.

It should be understood that, only for ease of understanding, the several cases shown in FIG. 6 are used as examples to describe a method for determining a feedback mode according to the preset rule. However, this should not constitute any limitation on this application. When preset rules are different, feedback modes determined in a same case may also be slightly different.

In one embodiment, the preset rule is that the second feedback mode is used when the to-be-reported subbands are a full band, or otherwise, the first feedback mode is used.

When the to-be-reported subbands are a full band, that is, the to-be-reported subbands are continuous in frequency domain, and there may be a relatively large quantity of to-be-reported subbands, the PMI may be fed back in the second feedback mode by using a relationship between subbands. When the to-be-reported subbands are a full band, the to-be-reported subbands may be discontinuous in frequency domain, or there is a relatively small quantity of to-be-reported subbands. In this case, the PMI may be fed back in the first feedback mode.

It should be understood that the preset rules listed above are merely examples for ease of understanding, and should not constitute any limitation on this application. When the PMI feedback mode is determined according to one of the foregoing preset rules by default in a protocol, the network device and the terminal device may feed back the PMI and restore the precoding matrix based on a PMI feedback mode determined based on a corresponding preset rule.

When the third indication information is used to indicate (c), the third indication information may be used to implicitly indicate whether the PMI is determined in the first feedback mode or the second feedback mode. Specifically, when the third indication information indicates that a value of K is 0, it indicates that a frequency domain basis vector does not need to be determined, and it may be understood that the PMI is determined in the first feedback mode. When the third indication information indicates that the value of K is greater than 0, it indicates that a frequency domain basis vector needs to be determined, and it may be understood that the PMI is determined in the second feedback mode. It should be understood that the first feedback mode and the second feedback mode listed above are merely possible implementations, and should not constitute any limitation on this application. For example, the second feedback mode may alternatively be a feedback mode combining a wideband feedback and some per-subband feedbacks. For example, feedback is performed based on only a subband whose sequence number is an odd number or feedback is performed based on only a subband whose sequence number is an even number. That is, in the second feedback mode, only amplitude coefficients and phase coefficients of some subbands may be fed back. Correspondingly, in the first feedback mode, amplitude coefficients and phase coefficients of all subbands may be separately fed back. That the network device and the terminal device determine the PMI feedback mode in a same manner provided that the feedback overheads of the first feedback mode is higher than the feedback overheads of the second feedback mode should fall within the protection scope of this application.

It should be further understood that when the third indication information is (c), the second feedback mode may be specifically the feedback mode described in the method 300.

In operation 4302, a specific process in which the terminal device determines the PMI based on the feedback mode may include: The terminal device determines the PMI based on the first feedback mode, or the terminal device determines the PMI based on the second feedback mode.

For a specific process in which the terminal device determines the PMI based on the first feedback mode, refer to a feedback mode of the type II codebook in the conventional technology. For brevity, details are not described herein.

For a specific process in which the terminal device determines the PMI based on the second feedback mode, refer to the foregoing specific description of the method 300. For brevity, details are not described herein again.

In operation 440, the terminal device sends the PMI. Correspondingly, the network device receives the PMI.

It should be understood that a specific process of operation 440 is the same as a specific process of operation 350 in the foregoing method 300. For brevity, details are not described herein again.

According to the foregoing method, the terminal device may determine the feedback mode based on an indication of the network device, or based on at least the quantity or the positions of the to-be-reported subbands. In some cases, the PMI may be fed back in a feedback mode with relatively low feedback overheads. For example, when there are a relatively large quantity of to-be-reported subbands or continuity is relatively good, the PMI is fed back in the feedback mode with relatively low feedback overheads. This can ensure relatively high approximation precision, and can also reduce feedback overheads. A plurality of feedback modes are introduced to adapt to different measurement cases, and both feedback precision and feedback overheads may be considered, thereby achieving a balance between the two. In addition, the second feedback mode provided in this application may be well compatible with an existing feedback mode, and has a small change to an existing protocol and is easy to implement.

The foregoing describes in detail the precoding matrix indication method and the precoding matrix determining method provided in the embodiments of this application with reference to FIG. 2 to FIG. 6. The following describes in detail communications apparatuses provided in the embodiments of this application with reference to FIG. 7 to FIG. 9.

Figure 7:
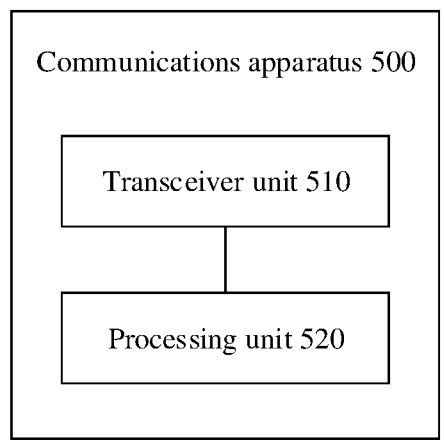
FIG. 7 is a schematic block diagram of a communications apparatus according to an embodiment of this application.

FIG. 7 is a schematic block diagram of a communications apparatus according to an embodiment of this application. As shown in FIG. 7, the apparatus 500 may include a transceiver unit 510 and a processing unit 520.

In a possible design, the communications apparatus 500 may correspond to the terminal device in the foregoing method embodiments, for example, may be a terminal device, or may be a chip configured in the terminal device.

Specifically, the communications apparatus 500 may correspond to the terminal device in the method 300 or 400 according to the embodiments of this application. The communications apparatus 500 may include units configured to perform the method performed by the terminal device in the method 300 in FIG. 3 or the method 400 in FIG. 5. In addition, the units in the communications apparatus 500 and the foregoing other operations or functions are separately intended to implement corresponding procedures of the method 300 in FIG. 3 or the method 400 in FIG. 5.

When the communications apparatus 500 is configured to perform the method 300 in FIG. 3, the transceiver unit 510 may be configured to perform operation 320 to operation 350 in the method 300, and the processing unit 520 may be configured to perform operation 310 in the method 300.

Specifically, the processing unit 520 is configured to determine a PMI, where the PMI includes R groups of space-frequency information corresponding to R transmission layers, the R groups of space-frequency information are used to determine a precoding matrix of each subband, and an $r^{th}$ group of space-frequency information in the R groups of space-frequency information is used to indicate:

P×L space domain vectors corresponding to an $r^{th}$ transmission layer,

K frequency domain vectors corresponding to the $r^{th}$ transmission layer, and P×L×K coefficients corresponding to the $r^{th}$ transmission layer.

The P×L space domain vectors are determined by L beam vectors in each of P polarization directions and wideband amplitude coefficients of the L beam vectors, each of the P×L×K coefficients is used to indicate a linear superposition coefficient of a vector operation result of one of the P×L space domain vectors and one of the K frequency domain vectors, R is a quantity of transmission layers, P is a quantity of polarization directions, and R, r, P, L, and K are all positive integers.

The transceiver unit 510 is configured to send the PMI.

In one embodiment, the space domain vector is a $(P \times N_{tx}) \times 1$-dimensional column vector, the frequency domain vector is an $N_{sb} \times 1$-dimensional column vector, and the vector operation result includes: a product of the space domain vector and a conjugate transpose of the frequency domain vector, or a Kronecker product of a conjugate of the frequency domain vector and the space domain vector, where $N_{tx}$ is a quantity of antenna ports in each polarization direction, $N_{sb}$ is a quantity of to-be-reported subbands, $1 \leq L \leq N_{tx}$, $1 \leq K \leq N_{sb}$, and both $N_{tx}$ and $N_{sb}$ are positive integers.

In one embodiment, the L beam vectors are from a subset of a predefined first vector set, the PMI further includes indication information of the first subset, and the indication information of the first subset is used to indicate a position, in the first vector set, of each vector in the first subset.

In one embodiment, the K frequency domain vectors are from a second subset of a predefined second vector set, the PMI further includes indication information of the second subset, and the indication information of the second subset is used to indicate a position, in the second vector set, of each vector in the second subset.

In one embodiment, the transceiver unit 510 is further configured to receive first indication information, where the first indication information is used to indicate a value of K.

In one embodiment, the transceiver unit 510 is further configured to receive second indication information, where the second indication information is used to indicate a value of L.

When the communications apparatus 500 is configured to perform the method 400 in FIG. 5, the transceiver unit 510 may be configured to perform operation 420 and operation 440 in the method 400, and the processing unit 520 may be configured to perform operation 430 in the method 400.

Specifically, the transceiver unit 510 may be configured to receive third indication information, where the third indication information is used to determine a feedback mode for feeding back a precoding matrix indicator PMI based on a type II codebook, the feedback mode is a first feedback mode or a second feedback mode, the first feedback mode is a mode for feeding back the PMI based on a first vector set, the second feedback mode is a mode for feeding back the PMI based on the first vector set and a second vector set, the first vector set includes a plurality of $N_{tx}$-dimensional vectors, the second vector set includes a plurality of $N_{sb}$-dimensional vectors, $N_{tx}$ is a quantity of transmit antenna ports in each polarization direction, $N_{sb}$ is a quantity of to-be-reported subbands, and both $N_{tx}$ and $N_{sb}$ are positive integers.

The processing unit 520 is configured to determine and send the PMI based on the feedback mode.

In one embodiment, the third indication information includes indication information of the feedback mode of the PMI.

In one embodiment, the third indication information is used to indicate a quantity and positions of the to-be-reported subbands, and the method further includes: determining the feedback mode of the PMI according to a preset rule based on at least the quantity or the positions of the to-be-reported subbands.

In one embodiment, the third indication information is carried in a radio resource control RRC message.

In one embodiment, when the feedback mode is the second feedback mode, the PMI includes R groups of space-frequency information corresponding to R transmission layers, the R groups of space-frequency information are used to determine a precoding matrix corresponding to each subband, and an $r^{th}$ group of space-frequency information in the R groups of space-frequency information is used to indicate:

P×L space domain vectors corresponding to an $r^{th}$ transmission layer,

K frequency domain vectors corresponding to the $r^{th}$ transmission layer, and P×L×K coefficients corresponding to the $r^{th}$ transmission layer.

The P×L space domain vectors are determined by L beam vectors in each of P polarization directions and wideband amplitude coefficients of the L beam vectors, each of the P×L×K coefficients is used to indicate a linear superposition coefficient of a vector operation of one of the P×L space domain vectors and one of the K frequency domain vectors, the L beam vectors are determined based on the first vector set, the K frequency domain vectors are determined based on the second vector set, R is a quantity of transmission layers, P is a quantity of polarization directions, and R, r, P, L, and K are all positive integers.

It should be understood that a specific process in which each unit performs the foregoing corresponding operations is described in detail in the foregoing method embodiment, and for brevity, details are not described herein.

Figure 8:
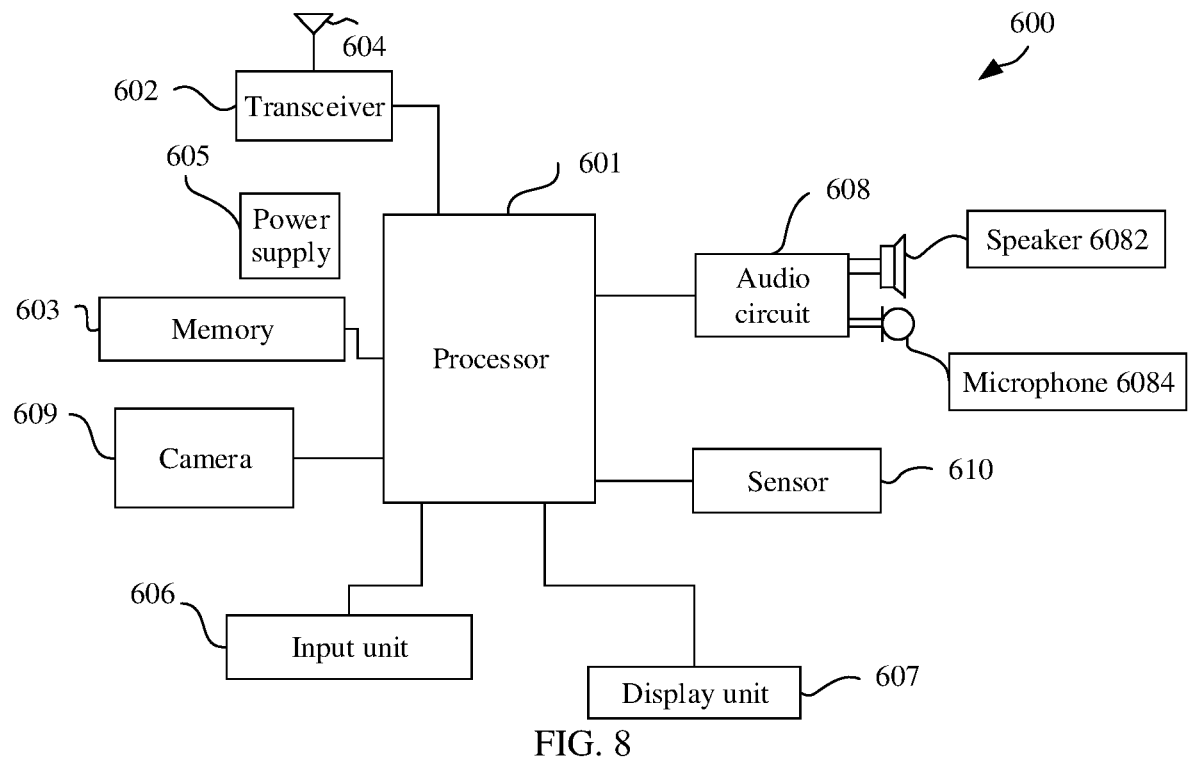
FIG. 8 is a schematic structural diagram of a terminal device according to an embodiment of this application.

It should be understood that the transceiver unit in the communications apparatus 500 may correspond to a transceiver 602 in a terminal device 600 shown in FIG. 8, and the processing unit 520 in the communications apparatus 500 may correspond to a processor 601 in the terminal device 600 shown in FIG. 8.

In another possible design, the communications apparatus 500 may correspond to the network device in the foregoing method embodiment, for example, may be a network device, or may be a chip configured in the network device.

Specifically, the communications apparatus 500 may correspond to the network device in the method 300 or 400 according to the embodiments of this application. The communications apparatus 500 may include units configured to perform the method performed by the network device in the method 300 in FIG. 3 or the method 400 in FIG. 5. In addition, the units in the communications apparatus 500 and the foregoing other operations or functions are separately intended to implement corresponding procedures of the method 300 in FIG. 3 or the method 400 in FIG. 5.

When the communications apparatus 500 is configured to perform the method 300 in FIG. 3, the transceiver unit 510 may be configured to perform operation 320 to operation 350 in the method 300, and the processing unit 520 may be configured to perform operation 360 in the method 300.

Specifically, the transceiver unit 510 may be configured to receive a precoding matrix indicator PMI, where the PMI includes R groups of space-frequency information corresponding to R transmission layers, and an $r^{th}$ group of space-frequency information in the R groups of space-frequency information is used to indicate:

P×L space domain vectors corresponding to an $r^{th}$ transmission layer,

K frequency domain vectors corresponding to the $r^{th}$ transmission layer, and P×L×K coefficients corresponding to the $r^{th}$ transmission layer.

The P×L space domain vectors are determined by L beam vectors in each of P polarization directions and wideband amplitude coefficients of the L beam vectors, each of the P×L×K coefficients is used to indicate a linear superposition coefficient of a vector operation result of one of the P×L space domain vectors and one of the K frequency domain vectors, R is a quantity of transmission layers, P is a quantity of polarization directions, and R, r, P, L, and K are all positive integers.

The processing unit 520 is configured to determine a precoding matrix of each subband based on the R groups of space-frequency information.

In one embodiment, the space domain vector is a $(P \times N_{tx}) \times 1$-dimensional column vector, the frequency domain vector is an $N_{sb} \times 1$-dimensional column vector, and the vector operation result includes: a product of the space domain vector and a conjugate transpose of the frequency domain vector, or a Kronecker product of a conjugate of the frequency domain vector and the space domain vector, where $N_t$ is a quantity of antenna ports in each polarization direction, $N_{sb}$ is a quantity of to-be-reported subbands, $1 \leq L \leq N_{tx}$, $1 \leq K \leq N_{sb}$, and both $N_{tx}$ and $N_{sb}$ are positive integers.

In one embodiment, the L beam vectors are from a subset of a predefined first vector set, the PMI further includes indication information of the first subset, and the indication information of the first subset is used to indicate a position, in the first vector set, of each vector in the first subset.

In one embodiment, the K frequency domain vectors are from a second subset of a predefined second vector set, the PMI further includes indication information of the second subset, and the indication information of the second subset is used to indicate a position, in the second vector set, of each vector in the second subset.

In one embodiment, the transceiver unit 510 is further configured to send first indication information, where the first indication information is used to indicate a value of K.

In one embodiment, the transceiver unit 510 is further configured to send second indication information, where the second indication information is used to indicate a value of L.

In one embodiment, the space domain vector is a $(P \times N_{tx}) \times 1$-dimensional column vector, the frequency domain vector is an $N_{sb} \times 1$-dimensional column vector, and the quantity of polarization directions is 1. The processing unit 520 is specifically configured to select, in a traversing manner, each of 1 to $N_{sb}$ as a value of $n_{sb}$, and repeatedly perform the following operations, to obtain the precoding matrix corresponding to each subband:

selecting, in a traversing manner, each of 1 to R as a value of r, and repeatedly performing the following operation to determine a precoding matrix of an $n_{sb}^{th}$ subband: determining a precoding vector $w_{r,n_{sb}}$ of the $n_{sb}^{th}$ subband at the $r^{th}$ transmission layer based on the P×L space domain vectors, the K frequency domain vectors, and the P×L×K coefficients that are indicated by the $r^{th}$ group of space-frequency information in the R groups of space-frequency information:

$$w_{r,n_{sb}} = \sum_{l=1}^{L} v_l a_{r,l}^{(1)} \left( \sum_{k=1}^{K} a_{r,l,k}^{(2)} \varphi_{r,l,k} \bar{u}_{r,k,n_{sb}} \right),$$

where $v_l$ represents an $l^{th}$ beam vector in the L beam vectors corresponding to the $r^{th}$ transmission layer, $a_{r,l}^{(1)}$ represents a quantized value of an amplitude coefficient of $v_l$, $u_{r,k,n_{sb}}$ represents an $n_{sb}^{th}$ element in a $k^{th}$ frequency domain vector in the K frequency domain vectors corresponding to the $r^{th}$ transmission layer, $\bar{u}_{r,k,n_{sb}}$ represents a conjugate of $u_{r,k,n_{sb}}$, $a_{r,l,k}^{(2)}$ represents a quantized value of an amplitude of a linear superposition coefficient corresponding to an $l^{th}$ space domain vector in the P×L space domain vectors and the $k^{th}$ frequency domain vector in the K frequency domain vectors, $\varphi_{r,l,k}$ represents a quantized value of a phase of the linear superposition coefficient corresponding to the $l^{th}$ space domain vector in the P×L space domain vectors and the $k^{th}$ frequency domain vector in the K frequency domain vectors, and l and k are both positive integers.

In one embodiment, the space domain vector is a $(P \times N_{tx}) \times 1$-dimensional column vector, the frequency domain vector is an $N_{sb} \times 1$-dimensional column vector, and the quantity of polarization directions is 2. The processing unit 520 is specifically configured to select, in a traversing manner, each of 1 to $N_{sb}$ as a value of $n_{sb}$, and repeatedly perform the following operations, to obtain the precoding matrix corresponding to each subband:

selecting, in a traversing manner, each of 1 to R as a value of r, and repeatedly performing the following operation to determine a precoding matrix of an $n_{sb}^{th}$ subband: determining a precoding vector $w_{r,n_{sb}}$ of the $n_{sb}^{th}$ subband at the $r^{th}$ transmission layer based on the P×L space domain vectors, the K frequency domain vectors, and the P×L×K coefficients that are indicated by the $r^{th}$ group of space-frequency information in the R groups of space-frequency information:

$$w_{r,n_{sb}} = \begin{bmatrix} \sum_{l=1}^{L} v_l a_{r,l}^{(1)} \left( \sum_{k=1}^{K} a_{r,l,k}^{(2)} \varphi_{r,l,k} u_{r,k,n_{sb}} \right) \\ \sum_{l=1}^{L} v_l a_{r,l+L}^{(1)} \left( \sum_{k=1}^{K} a_{r,l+L,k}^{(2)} \varphi_{r,l+L,k} u_{r,k,n_{sb}} \right) \end{bmatrix},$$

where $v_l$ represents an $l^{th}$ beam vector in the L beam vectors corresponding to the $r^{th}$ transmission layer, $a_{r,l}^{(1)}$ represents a quantized value of an amplitude coefficient of $v_l$ in a first polarization direction, $a_{r,l+L}^{(1)}$ represents a quantized value of an amplitude coefficient of $v_l$ in a second polarization direction, $u_{r,k,j}$ represents an $n_{sb}^{th}$ element in a $k^{th}$ frequency domain vector in the K frequency domain vectors corresponding to the $r^{th}$ transmission layer, $\bar{u}_{r,k,n_{sb}}$ represents a conjugate of $u_{r,k,n_{sb}}$, $a_{r,l,k}^{(2)}$ represents a quantized value of an amplitude of a linear superposition coefficient corresponding to the $l^{th}$ space domain vector in the L space domain vectors and the $k^{th}$ frequency domain vector in the K frequency domain vectors in the first polarization direction, $a_{r,l+L,k}^{(2)}$ represents a quantized value of an amplitude of a linear superposition coefficient corresponding to the $l^{th}$ space domain vector in the L space domain vectors and the $k^{th}$ frequency domain vector in the K frequency domain vectors in the second polarization direction, $\varphi_{r,l,k}$ represents a quantized value of a phase of the linear superposition coefficient corresponding to the $l^{th}$ space domain vector in the L space domain vectors and the $k^{th}$ frequency domain vector in the K frequency domain vectors in the first polarization direction, $\varphi_{r,l+L,k}$ represents a quantized value of a phase of the linear superposition coefficient corresponding to the $l^{th}$ space domain vector in the L space domain vectors and the $k^{th}$ frequency domain vector in the K frequency domain vectors in the second polarization direction, and both l and k are positive integers.

When the communications apparatus 500 is configured to perform the method 400 in FIG. 5, the transceiver unit 510 is configured to perform operation 420 and operation 440 in the method 400, and the processing unit 520 may be configured to perform operation 410 in the method 400.

Specifically, the processing unit 520 may be configured to generate third indication information, where the third indication information is used to determine a feedback mode for feeding back a precoding matrix indicator PMI based on a type II codebook, the feedback mode is a first feedback mode or a second feedback mode, the first feedback mode is a mode for feeding back the PMI based on a first vector set, the second feedback mode is a mode for feeding back the PMI based on the first vector set and a second vector set, the first vector set includes a plurality of $N_{tx}$-dimensional vectors, the second vector set includes a plurality of $N_{sb}$-dimensional vectors, $N_{tx}$ is a quantity of transmit antenna ports in each polarization direction, $N_{sb}$ is a quantity of to-be-reported subbands, and both $N_{tx}$ and $N_{sb}$ are positive integers.

The transceiver unit 510 may be configured to send the third indication information and receive the PMI, where the PMI is determined based on the feedback mode.

In one embodiment, the third indication information includes indication information of the feedback mode of the PMI.

In one embodiment, the third indication information is used to indicate a quantity and positions of the to-be-reported subbands, and the method further includes: determining the feedback mode of the PMI according to a preset rule based on at least the quantity or the positions of the to-be-reported subbands.

In one embodiment, the third indication information is carried in a radio resource control RRC message.

In one embodiment, when the feedback mode is the second feedback mode, the PMI includes R groups of space-frequency information corresponding to R transmission layers, the R groups of space-frequency information are used to determine a precoding matrix corresponding to each subband, and an $r^{th}$ group of space-frequency information in the R groups of space-frequency information is used to indicate:

P×L space domain vectors corresponding to an $r^{th}$ transmission layer,

K frequency domain vectors corresponding to the $r^{th}$ transmission layer, and P×L×K coefficients corresponding to the $r^{th}$ transmission layer.

The P×L space domain vectors are determined by L beam vectors in each of P polarization directions and wideband amplitude coefficients of the L beam vectors, each of the P×L×K coefficients is used to indicate a linear superposition coefficient of a vector operation of one of the P×L space domain vectors and one of the K frequency domain vectors, the L beam vectors are determined based on the first vector set, the K frequency domain vectors are determined based on the second vector set, R is a quantity of transmission layers, P is a quantity of polarization directions, and R, r, P, L, and K are all positive integers.

It should be understood that a specific process in which each unit performs the foregoing corresponding operations is described in detail in the foregoing method embodiment, and for brevity, details are not described herein.

Figure 9:
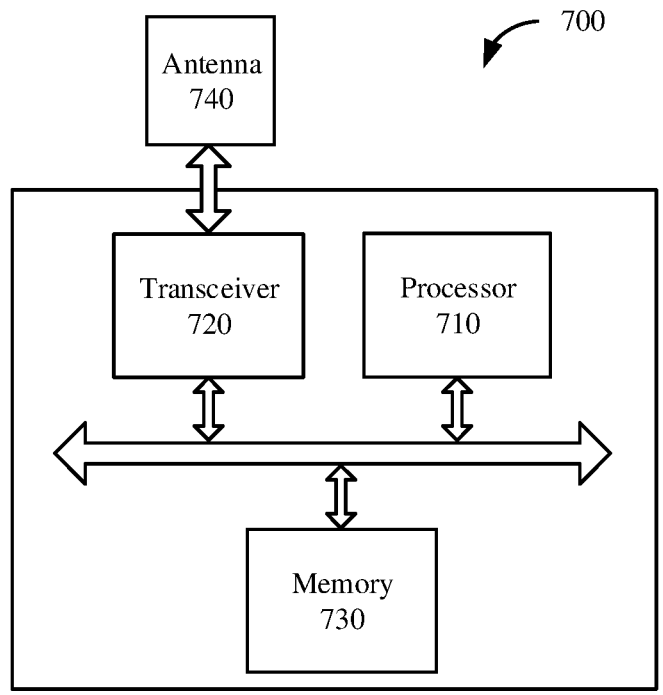
FIG. 9 is a schematic structural diagram of a network device according to an embodiment of this application.

It should be further understood that the transceiver unit 510 in the communications apparatus 500 may correspond to a transceiver 720 in a network device 700 shown in FIG. 9, and the processing unit 520 in the communications apparatus 500 may correspond to a processor 710 in the network device 700 shown in FIG. 9.

FIG. 8 is a schematic structural diagram of a terminal device 600 according to an embodiment of this application. As shown in the figure, the terminal device 600 includes a processor 601 and a transceiver 602. In one embodiment, the terminal device 500 further includes a memory 603. The processor 601, the transceiver 602, and the memory 603 communicate with each other through an internal connection path, to transfer at least a control signal or a data signal. The memory 603 is configured to store a computer program. The processor 601 is configured to invoke the computer program from the memory 603 and run the computer program, to control the transceiver 602 to receive/send a signal. In one embodiment, the terminal device 500 may further include an antenna 504, configured to send, by using a radio signal, uplink data or uplink control signaling output by the transceiver 602.

The processor 601 and the memory 603 may be integrated into one processing apparatus. The processor 601 is configured to execute program code stored in the memory 603, to implement the foregoing functions. During specific implementation, the memory 603 may alternatively be integrated into the processor 601, or may be independent of the processor 601.

In one embodiment, when the program instruction stored in the memory 603 is executed by the processor 601, the processor 601 is configured to: determine a PMI, and control the transceiver 602 to send the PMI.

The PMI includes R groups of space-frequency information corresponding to R transmission layers, and the R groups of space-frequency information are used to determine a precoding matrix of each subband. An $r^{th}$ group of space-frequency information in the R groups of space-frequency information is used to indicate:

P×L space domain vectors corresponding to an $r^{th}$ transmission layer,

K frequency domain vectors corresponding to the $r^{th}$ transmission layer, and P×L×K coefficients corresponding to the $r^{th}$ transmission layer.

The P×L space domain vectors are determined by L beam vectors in each of P polarization directions and wideband amplitude coefficients of the L beam vectors, each of the P×L×K coefficients is used to indicate a linear superposition coefficient of a vector operation result of one of the P×L space domain vectors and one of the K frequency domain vectors, R is a quantity of transmission layers, P is a quantity of polarization directions, and R, r, P, L, and K are all positive integers.

In one embodiment, when the program instruction stored in the memory 603 is executed by the processor 601, the processor 601 is configured to control the transceiver 602 to receive third indication information, and determine and send a PMI based on a feedback mode. The third indication information is used to determine a feedback mode for feeding back a precoding matrix indicator PMI based on a type II codebook, the feedback mode is a first feedback mode or a second feedback mode, the first feedback mode is a mode for feeding back the PMI based on a first vector set, and the second feedback mode is a mode for feeding back the PMI based on the first vector set and a second vector set. The first vector set includes a plurality of $N_{tx}$-dimensional vectors, the second vector set includes a plurality of $N_{sb}$-dimensional vectors, $N_{tx}$ is a quantity of transmit antenna ports in each polarization direction, $N_{sb}$ is a quantity of to-be-reported subbands, and both $N_{tx}$ and $N_{sb}$ are positive integers.

Specifically, the terminal device 600 may correspond to the terminal device in the method 300 or 400 according to the embodiments of this application. The terminal device 600 may include units configured to perform the method performed by the terminal device in the method 300 in FIG. 3 or the method 400 in FIG. 5. In addition, the units in the terminal device 600 and the foregoing other operations or functions are separately intended to implement corresponding procedures of the method 300 in FIG. 3 or the method 400 in FIG. 5.

The processor 601 may be configured to perform an action implemented inside the terminal device in the foregoing method embodiments, and the transceiver 602 may be configured to perform an action of sending from the terminal device to the network device and an action of receiving from the network device in the foregoing method embodiments. For details, refer to the descriptions in the foregoing method embodiments. Details are not described herein again.

In one embodiment, the terminal device 600 may further include a power supply 605, configured to supply power to various components or circuits in the terminal device.

In addition, to make functions of the terminal device more perfect, the terminal device 600 may further include one or more of an input unit 606, a display unit 607, an audio circuit 608, a camera 609, a sensor 610, and the like, and the audio circuit may further include a speaker 6082, a microphone 6084, and the like.

FIG. 9 is a schematic structural diagram of a network device 700 according to an embodiment of this application. As shown in the figure, the network device 700 includes a processor 710 and a transceiver 720. In one embodiment, the network device 700 further includes a memory 730. The processor 710, the transceiver 720, and the memory 730 communicate with each other through an internal connection path, to transfer at least a control signal or a data signal. The memory 730 is configured to store a computer program. The processor 710 is configured to invoke the computer program from the memory 730 and run the computer program, to control the transceiver 720 to send and receive a signal.

The processor 710 and the memory 730 may be integrated into one processing apparatus. The processor 710 is configured to execute program code stored in the memory 730, to implement the foregoing functions. During specific implementation, the memory 730 may alternatively be integrated into the processor 710, or may be independent of the processor 710.

The network device 700 may further include an antenna 740, configured to send, by using a radio signal, downlink data or downlink control signaling output by the transceiver 720.

In one embodiment, when the program instruction stored in the memory 730 is executed by the processor 710, the processor 710 is configured to control the transceiver 720 to receive a PMI, where the PMI includes R groups of space-frequency information corresponding to R transmission layers, and determine a precoding matrix of each subband based on the R groups of space-frequency information. An $r^{th}$ group of space-frequency information in the R groups of space-frequency information is used to indicate:

P×L space domain vectors corresponding to an $r^{th}$ transmission layer,

K frequency domain vectors corresponding to the $r^{th}$ transmission layer, and P×L×K coefficients corresponding to the $r^{th}$ transmission layer.

The P×L space domain vectors are determined by L beam vectors in each of P polarization directions and wideband amplitude coefficients of the L beam vectors, each of the P×L×K coefficients is used to indicate a linear superposition coefficient of a vector operation result of one of the P×L space domain vectors and one of the K frequency domain vectors, R is a quantity of transmission layers, P is a quantity of polarization directions, and R, r, P, L, and K are all positive integers.

In one embodiment, when the program instruction stored in the memory 730 is executed by the processor 710, the processor 710 is configured to generate third indication information, and control the transceiver 720 to send the third indication information. The third indication information is used to determine a feedback mode for feeding back a precoding matrix indicator PMI based on a type II codebook, the feedback mode is a first feedback mode or a second feedback mode, the first feedback mode is a mode for feeding back the PMI based on a first vector set, and the second feedback mode is a mode for feeding back the PMI based on the first vector set and a second vector set. The first vector set includes a plurality of $N_{tx}$-dimensional vectors, the second vector set includes a plurality of $N_{sb}$-dimensional vectors, $N_{tx}$ is a quantity of transmit antenna ports in each polarization direction, $N_{sb}$ is a quantity of to-be-reported subbands, and both $N_{tx}$ and $N_{sb}$ are positive integers.

Specifically, the network device 700 may correspond to the network device in the method 300 or 400 according to the embodiments of this application. The network device 700 may include units configured to perform the method performed by the network device in the method 300 in FIG. 3 or the method 400 in FIG. 5. In addition, the units in the network device 700 and the foregoing other operations or functions are separately used to implement a corresponding procedure of the method 300 in FIG. 3 or the method 400 in FIG. 5. A specific process in which the units perform the foregoing corresponding operations is described in detail in the foregoing method embodiments. For brevity, details are not described herein again.

The processor 710 may be configured to perform an action implemented inside the network device in the foregoing method embodiments, and the transceiver 720 may be configured to perform an action of sending from the network device to the terminal device and an action of receiving from the terminal device in the foregoing method embodiments. For details, refer to the descriptions in the foregoing method embodiments. Details are not described herein again.

It should be understood that, the processor in the embodiments of this application may be a central processing unit (CPU). The processor may alternatively be another general-purpose processor, a digital signal processor (DSP), an application-specific integrated circuit (ASIC), a field programmable gate array (FPGA) or another programmable logic device, a discrete gate or a transistor logic device, a discrete hardware component, or the like.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache. As examples instead of limitative descriptions, random access memories (RAM) in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

According to the methods provided in the embodiments of this application, this application further provides a computer program product. The computer program product includes computer program code. When the computer program code is run on a computer, the computer is enabled to perform the method in the embodiment shown in FIG. 3 or FIG. 5.

According to the methods provided in the embodiments of this application, this application further provides a computer readable medium. The computer readable medium stores program code. When the program code is run on a computer, the computer is enabled to perform the method in the embodiment shown in FIG. 3 or FIG. 5.

According to the methods provided in the embodiments of this application, this application further provides a system. The system includes the foregoing one or more terminal devices and one or more network devices.

The network device and the terminal device in the foregoing apparatus embodiments correspond to the network device and the terminal device in the method embodiments. A corresponding module or unit performs a corresponding operation. For example, a communications unit (transceiver) performs at least a sending operation or a receiving operation in the method embodiments, and another operation other than the sending operation and the receiving operation may be performed by the processing unit (processor). For a function of a specific unit, refer to the corresponding method embodiments. There may be one or more processors.

The terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, or a computer. As shown in figures, both a computing device and an application that runs on a computing device may be components. One or more components may reside within a process or an execution thread, and a component may be located on one computer or distributed between two or more computers. In addition, these components may be executed from various computer readable media that store various data structures. For example, the components may communicate by using a local or remote process and according to, for example, a signal having one or more data packets (for example, data from two components interacting with another component in a local system, a distributed system, or across a network such as the internet interacting with another system by using the signal).

A person of ordinary skill in the art may be aware that units, algorithms, and operations in the examples described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

In the foregoing embodiments, all or some of the functions of the functional units may be implemented by software, hardware, firmware, or any combination thereof. When the software is used to implement the embodiments, all or some of the embodiments may be implemented in a form of a computer program product. The computer program product includes one or more computer instructions (programs). When the computer program instructions (programs) are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

When the functions are implemented in a form of a software function unit and sold or used as an independent product, the functions may be stored in a computer readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the operations of the methods in the embodiments of this application. The foregoing storage medium includes any medium that can store program code, such as a USB flash drive, a removable hard disk, a read-only memory (ROM), a random access memory (RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A precoding matrix indication method, comprising:
    determining a precoding matrix indicator (PMI), wherein the PMI comprises R groups of space-frequency information corresponding to R transmission layers, wherein the R groups of space-frequency information are for determining a precoding matrix of each subband, and wherein an $r^{th}$ group of space-frequency information in the R groups of space-frequency information indicates P×L space domain vectors corresponding to an $r^{th}$ transmission layer in the R transmission layers, K frequency domain vectors corresponding to the $r^{th}$ transmission layer, and P×L×K coefficients corresponding to the $r^{th}$ transmission layer, wherein the P×L space domain vectors are determined by L beam vectors in each of P polarization directions and wideband amplitude coefficients of the L beam vectors, wherein each of the P×L×K coefficients indicates a linear superposition coefficient of a vector operation result of one space domain vector of the P×L space domain vectors and one frequency domain vector of the K frequency domain vectors, wherein R is a quantity of transmission layers, wherein P is a quantity of polarization directions, and wherein R, r, P, L, and K are all positive integers; and
    sending the PMI.

2. The method according to claim 1, wherein each space domain vector of the P×L space domain vectors is a (P×Ntx)×1-dimensional column vector, wherein each frequency domain vector of the K frequency domain vectors is an Nsb×1-dimensional column vector, and wherein the vector operation result comprises at least one of a product of the space domain vector and a conjugate transpose of the frequency domain vector, or a Kronecker product of a conjugate of the frequency domain vector and the space domain vector, wherein Ntx is a quantity of antenna ports in each polarization direction, wherein Nsb is a quantity of to-be-reported subbands, wherein 1≤L≤Ntx, 1≤K≤Nsb, and wherein both Ntx and Nsb are positive integers.

3. The method according to claim 1, wherein the L beam vectors are from a first subset of a predefined first vector set, wherein the PMI further comprises indication information of the first subset, and wherein the indication information of the first subset indicates a position, in the first vector set, of each vector in the first subset.

4. The method according to claim 1, wherein the K frequency domain vectors are from a second subset of a predefined second vector set, wherein the PMI further comprises indication information of the second subset, and wherein the indication information of the second subset indicates a position, in the second vector set, of each vector in the second subset.

5. The method according to claim 1, further comprising:
    receiving first indication information, wherein the first indication information indicates a value of K.

6. The method according to claim 5, wherein the first indication information indicating the value of K is received in signaling that is the same as second indication information indicating a value of L.

7. The method according to claim 1, further comprising:
    receiving second indication information, wherein the second indication information indicates a value of L.

8. A communications apparatus, comprising:
    at least one processor;
    a transceiver coupled with the at least one processor and configured to communicate with another apparatus; and
    a non-transitory computer-readable storage medium coupled with the at least one processor and storing a program to be executed by the at least one processor, the program including instructions to:
        determine a precoding matrix indicator (PMI), wherein the PMI comprises R groups of space-frequency information corresponding to R transmission layers, wherein the R groups of space-frequency information are for determining a precoding matrix of each subband, and wherein an $r^{th}$ group of space-frequency information in the R groups of space-frequency information indicates P×L space domain vectors corresponding to an $r^{th}$ transmission layer in the R transmission layers, K frequency domain vectors corresponding to the $r^{th}$ transmission layer, and P×L×K coefficients corresponding to the $r^{th}$ transmission layer, wherein the P×L space domain vectors are determined by L beam vectors in each of P polarization directions and wideband amplitude coefficients of the L beam vectors, wherein each of the P×L×K coefficients indicates a linear superposition coefficient of a vector operation result of one of the P×L space domain vectors and one of the K frequency domain vectors, wherein R is a quantity of transmission layers, wherein P is a quantity of polarization directions, and wherein R, r, P, L, and K are all positive integers; and
        cause the transceiver to send the PMI.

9. The communications apparatus according to claim 8, wherein each space domain vector of the P×L space domain vectors is a (P×Ntx)×1-dimensional column vector, wherein each frequency domain vector of the K frequency domain vectors is an Nsb×1-dimensional column vector, and wherein the vector operation result comprises at least one of a product of the space domain vector and a conjugate transpose of the frequency domain vector, or a Kronecker product of a conjugate of the frequency domain vector and the space domain vector, wherein Ntx is a quantity of antenna ports in each polarization direction, wherein Nsb is a quantity of to-be-reported subbands, wherein 1≤L≤Ntx, 1≤K≤Nsb, and wherein both Ntx and Nsb are positive integers.

10. The communications apparatus according to claim 8, wherein the L beam vectors are from a first subset of a predefined first vector set, wherein the PMI further comprises indication information of the first subset, and wherein the indication information of the first subset indicates a position, in the first vector set, of each vector in the first subset.

11. The communications apparatus according to claim 8, wherein the K frequency domain vectors are from a second subset of a predefined second vector set, wherein the PMI further comprises indication information of the second subset, and wherein the indication information of the second subset indicates a position, in the second vector set, of each vector in the second subset.

12. The communications apparatus according to claim 8, wherein the program further includes instructions to receive first indication information, wherein the first indication information indicates a value of K.

13. The communications apparatus according to claim 12, wherein the first indication information indicating the value of K is received in signaling that is the same as second indication information indicating a value of L.

14. The communications apparatus according to claim 8, wherein the program further includes instructions to receive second indication information, wherein the second indication information indicates a value of L.

15. A non-transitory computer readable medium, storing a program for execution on a computer, the program having instructions for:
  determining a precoding matrix indicator (PMI), wherein the PMI comprises R groups of space-frequency information corresponding to R transmission layers, wherein the R groups of space-frequency information are for determining a precoding matrix of each subband, and wherein an $r^{th}$ group of space-frequency information in the R groups of space-frequency information indicates P×L space domain vectors corresponding to an $r^{th}$ transmission layer in the R transmission layers, K frequency domain vectors corresponding to the $r^{th}$ transmission layer, and P×L×K coefficients corresponding to the $r^{th}$ transmission layer, wherein the P×L space domain vectors are determined by L beam vectors in each of P polarization directions and wideband amplitude coefficients of the L beam vectors, wherein each of the P×L×K coefficients indicates a linear superposition coefficient of a vector operation result of one of the P×L space domain vectors and one of the K frequency domain vectors, wherein R is a quantity of transmission layers, wherein P is a quantity of polarization directions, and wherein R, r, P, L, and K are all positive integers; and
  sending the PMI.

16. The non-transitory computer readable medium according to claim 15, wherein each space domain vector of the P×L space domain vectors is a (P×Ntx)×1-dimensional column vector, wherein each frequency domain vector of the K frequency domain vectors is an Nsb×1-dimensional column vector, and wherein the vector operation result comprises ]] at least one of a product of the space domain vector and a conjugate transpose of the frequency domain vector, or a Kronecker product of a conjugate of the frequency domain vector and the space domain vector, wherein Ntx is a quantity of antenna ports in each polarization direction, wherein Nsb is a quantity of to-be-reported subbands, wherein 1≤L≤Ntx, 1≤K≤Nsb, and wherein both Ntx and Nsb are positive integers.

17. The non-transitory computer readable medium according to claim 15, wherein the L beam vectors are from a first subset of a predefined first vector set, wherein the PMI further comprises indication information of the first subset, and wherein the indication information of the first subset indicates a position, in the first vector set, of each vector in the first subset.

18. The non-transitory computer readable medium according to claim 15, wherein the K frequency domain vectors are from a second subset of a predefined second vector set, wherein the PMI further comprises indication information of the second subset, and wherein the indication information of the second subset indicates a position, in the second vector set, of each vector in the second subset.

19. The non-transitory computer readable medium according to claim 15, wherein the program further includes instructions to receive first indication information, wherein the first indication information indicates a value of K.

20. The non-transitory computer readable medium according to claim 15, wherein the program further includes instructions to receive second indication information, wherein the second indication information indicates a value of L.

* * * * *